United States Patent [19]

Burnsweig et al.

[11] 4,206,316
[45] Jun. 3, 1980

[54] TRANSMITTER-RECEIVER SYSTEM UTILIZING PULSE POSITION MODULATION AND PULSE COMPRESSION

[75] Inventors: Joseph Burnsweig, Los Angeles; Charles F. Bancroft, Shermam Oaks, both of Calif.

[73] Assignee: Hughes Aircraft Company, Culver City, Calif.

[21] Appl. No.: 1,982

[22] Filed: Jan. 8, 1979

Related U.S. Application Data

[63] Continuation of Ser. No. 907,072, May 18, 1978, abandoned, which is a continuation of Ser. No. 689,225, May 24, 1976, abandoned.

[51] Int. Cl.$^2$ .............................................. H04L 15/00
[52] U.S. Cl. ...................................... 178/66.1; 375/43; 375/94; 370/10
[58] Field of Search ............... 325/138, 139, 156, 157, 325/142, 143, 126–130, 321, 324; 179/15 A, 15 AW; 358/13, 141, 263; 178/68; 330/207 A

[56] References Cited

U.S. PATENT DOCUMENTS

| Re. 27,738 | 8/1973 | Honma | 325/143 |
|---|---|---|---|
| 2,266,401 | 12/1941 | Reeves | 325/143 |
| 2,557,950 | 6/1961 | DeLoraine | 325/143 |
| 2,619,632 | 11/1952 | Krumhansl | 325/143 |
| 2,662,118 | 12/1953 | Schouten | 325/143 |
| 3,348,151 | 10/1967 | Holmes | 325/143 |
| 3,388,336 | 6/1968 | Mattern | 325/137 |
| 3,519,938 | 7/1970 | Smith | 325/143 |
| 3,597,693 | 8/1971 | McNeilly | 325/321 |
| 3,619,501 | 11/1971 | Nussbaumer | 178/68 |
| 3,778,718 | 12/1973 | Bass | 325/139 |
| 3,883,685 | 5/1975 | Yumde | 358/138 |
| 3,899,745 | 8/1975 | Fletcher | 330/207 A |
| 3,939,380 | 2/1976 | Peer | 330/207 A |
| 4,004,082 | 1/1977 | Yumde | 358/141 |

Primary Examiner—Robert L. Griffin
Assistant Examiner—Michael A. Masinick
Attorney, Agent, or Firm—Walter J. Adam; W. H. MacAllister

[57] ABSTRACT

Transmitter are receiver systems are disclosed including an encoder and a decorder, respectively. The encoder samples an incoming analog video signal and operates a periodic bipolar pulse pair whose phase separation is proportional to the amplitudes of the sampled data, thus pulse position modulation (PPM). In one embodiment of the invention the coded in-phase pulses are applied to a first channel having an intermediate frequency (IF) dispersive delay line with a positive-sloped transfer function. The out-of-phase pulses are applied to a second channel having a dispersive delay line with a negative-sloped, or conjugate, transfer function. The two channels of positive and negative dispersed pulses are added together resulting in a complex IF waveform. The complex IF waveform is frequency translated to a suitable time varying DC voltage waveform for controlling a transmitter. The receiver system includes a decoder having first and second channels with respective first and second conjugate pulse compression lines or chirp filters for recovering the original bipolar coded data. The first pulse compression line, with a negative-shaped transfer function recovers the in-phase PPM pulses of the bipolar pulse pair. The second pulse compression line, having the conjungate slope, recovers the out-of-phase PPM of the bipolar pulse pair pulses. The PPM pulses in the first and second channels are translated into pulse-width modulated pulses which are then demodulated. The demodulated pulses are subtracted and the original data is recovered while at the same time the sampling frequency is filtered out.

19 Claims, 22 Drawing Figures

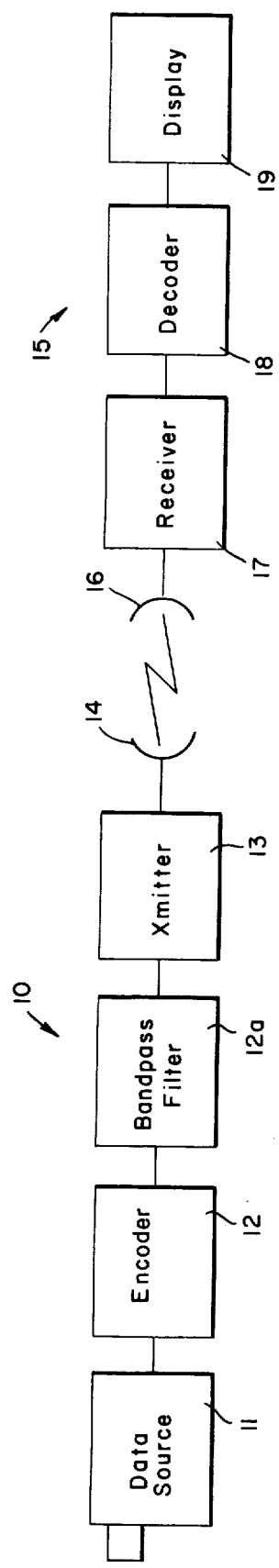
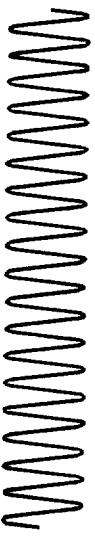
Fig. 21a
Fig. 21b
Fig. 1.

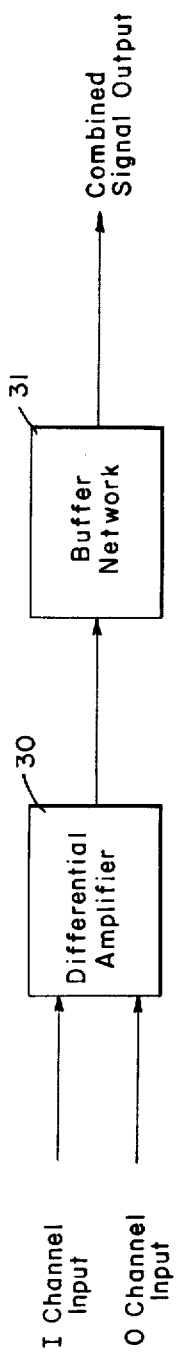
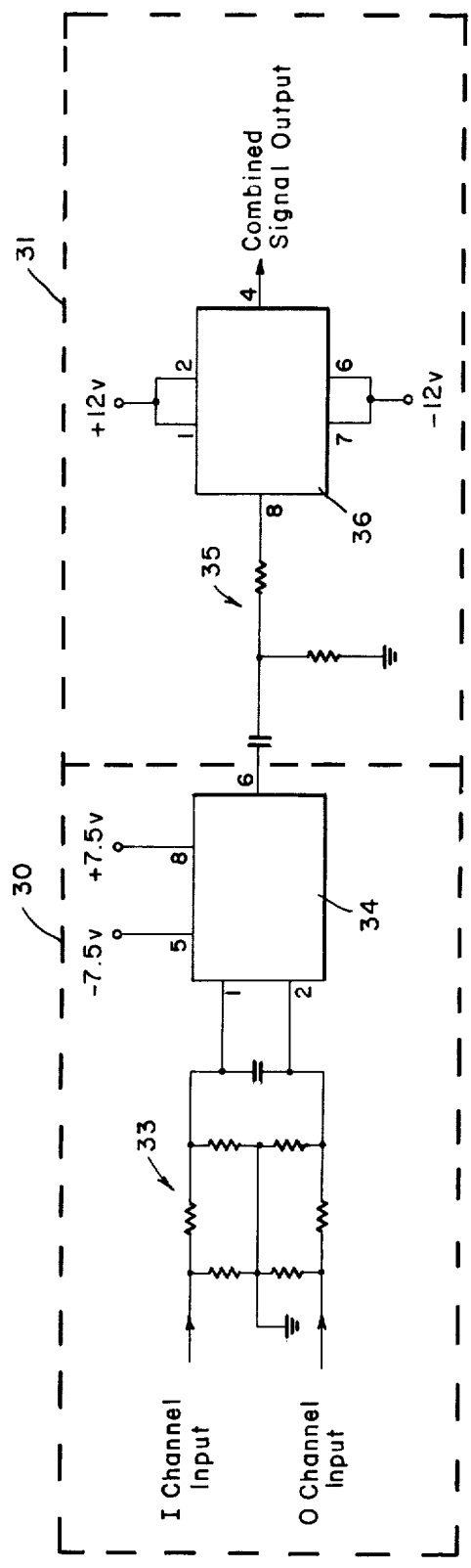

TRANSMITTER-RECEIVER SYSTEM UTILIZING PULSE POSITION MODULATION AND PULSE COMPRESSION

This is a continuation of application Ser. No. 907,072 filed May 18, 1978 and now abandoned, which in turn was a continuation of Ser. No. 689,225, filed May 24, 1976, and now abandoned.

FIELD OF THE INVENTION

This invention relates generally to a transmission and reception system utilizing coded signals. In particular, this invention relates to a television transmission and reception system having an encoder which codes an analog signal by utilizing pulse position modulation and chirp filters for providing a signal transmission having a high percentage modulation rate with respect to the carrier frequency.

DESCRIPTION OF THE PRIOR ART

Systems for transmission and reception of coded signals are well known in the prior art. For example, in one type of pulse code modulated (PCM) system a TV camera provides analog video signals to digitizing networks. These analog video signals may be digitized in a 6-bit code representing the grey levels corresponding to the amplitude of the analog signal at predetermined sampling intervals. In such a television system, a high power and long duration reference or sync pulse is transmitted which indicates the beginning of a frame or field of a television raster image. A series of coded pulses representing the grey levels of the sampled analog signal representing a scene is transmitted. Thus, for each field or frame, a reference pulse and the pulse coded video signal are generated and transmitted by an FM transmitter.

Coding systems such as the above described FM transmission and reception system have several limitations. The raw video signal must be sampled at a frequency which is at least twice the highest video frequency. Thus, a video signal of 4 MHz must be sampled at 8 MHz in order to provide sufficient information to reproduce the original video picture. A system having a sampling frequency of 8 MHz and 4 bits of digital data per sampling point requires excessive bandwidth to handle 32 megabits of digital data per second. Such a bandwidth necessitates utilizing complex high speed digital circuitry for reliable fidelity in transmission. Also, analog-to-digital converters are expensive and complex. In all systems heretofore, a reference or sync pulse has been required for synchronizing the receiver to the transmitter. If the reference pulse is lost or undetected, an entire field or frame of a scene may be lost. Another limitation of the high power and long duration sync pulse is that such a pulse is easily detected, which would in turn make the transmitter data susceptible to electronical interference. Generally, also, the FM transmission signal is of sufficient power that this type of coded waveform is easily detectable, since the signal format is recognized above the noise level.

SUMMARY OF THE INVENTION

Accordingly, it is the object of the present invention to provide an advanced system for transmitting and receiving coded signals.

It is another object of the present invention to provide a transmission and reception system which effectively eliminates the carrier frequencies while requiring very little filtering.

It is yet another object of the present invention to provide a transmission and reception system utilizing coded signals that are below the noise level.

It is another object of the present invention to provide a simple coded transmission signal that is difficult to detect and to interfere with electronically.

It is still another object of the present invention to provide a transmission system having high modulation rates compared to the carrier frequency.

It is yet another object of the present invention to provide a system having an improved low frequency response.

In accordance with the foregoing objects, a transmission and reception system according to a first embodiment of the present invention includes an encoder having means for providing first and second time varying signals. Each of the out-of-phase time varying signals are alternately sampled at a predetermined frequency and first and second pulses forming a bipolar pulse pair are generated in response to each sampling cycle. The pulses in each of the pulse pairs are time-offset in response to the amplitudes of the sampled signals, and are thus pulse position modulated. The pulse pairs may be transmitted to a receiver. Additional coding may be provided by applying the first and second pulses of the bipolar pulse pair to dispersive delay lines which provide respective output signals having conjugate slopes. Further coding may be provided by sampling the incoming signal four times per cycle and generating dual pairs of bipolar pulses. Suitable networks decode the bipolar pulses the dual bipolar pulses, and the frequency dispersed bipolar pulses. The decoding networks detect the bipolar pulses and demodulate them. The demodulated signals are combined thereby cancelling the carrier frequency and recovering the original time varying signal.

BRIEF DESCRIPTION OF THE DRAWINGS

FIG. 1 is a schematic block diagram illustrating a transmitter-receiver system.

FIG. 3 is a schematic block diagram of a combiner network according to FIG. 2.

FIG. 4 is a schematic circuit diagram of a combiner according to FIG. 3.

FIG. 21a is a diagram illustrating the output signals of prior art pulse position modulators/demodulators; and FIG. 21b is a waveform diagram illustrating the output signals of the present invention.

DETAILED DESCRIPTION OF THE DRAWING

Referring more specifically to FIG. 1, a transmitting and receiving system includes a transmitter system 10 electromagnetically coupled to a receiving system 15 via antennas 14 and 16, respectively. Alternatively, the transmitter and receiver systems may be linked directly together by telephone transmission lines, for example. The transmitter-receiver system may use any suitable carrier such as FM, for example. Also the data transmitted may be audio, video, telemetry data or other suitable information.

The transmitter system 10 includes a data source such as a video camera 11 which provides video signals of a scene being scanned. The camera 11 may have a bandpass frequency of 4 MHz and the TV format may be a standard commercial format.

Figure 10:
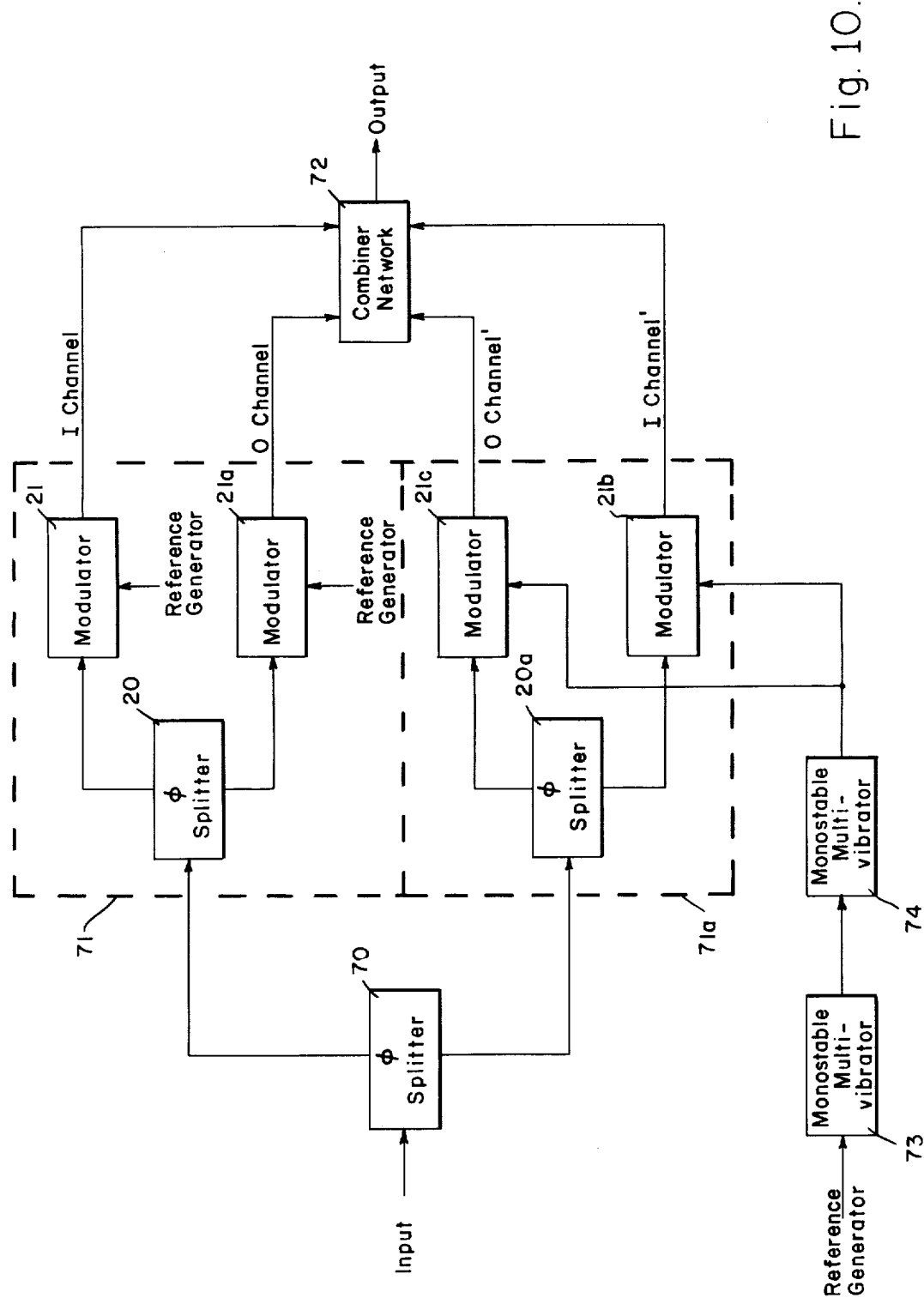
FIG. 10 is a schematic block diagram of a second embodiment of the invention.

The camera 11 is coupled to an encoder 12 which provides a pulse position modulated signal in response to the analog video signal from the camera 11. In one embodiment, the encoder samples the incoming video data and provides a pair of pulses during each sampling cycle, which pulses are time-offset corresponding to the amplitude of the analog signal. Thus the analog signal is sampled and coded by pulse position modulation (PPM) which makes possible high modulation rates, compared to the carrier frequency. The first embodiment is illustrated in FIGS. 2–9. FIG. 10 illustrates a second embodiment of the encoder, in which two pairs of pulses are generated in response to each sampling cycle for enhancing the noise rejection of the system. In a third embodiment (FIG. 13), the PPM pulse pairs are applied to dispersive delay lines which disperse the coded pulses along the bandpass frequency, the dispersed pulses being combined and transmitted. Thus, the analog signal is twice coded.

In one implementation the encoder 12 is coupled to a transmitter such as an FM transmitter 13, which in turn is coupled to a transmitter antenna 14. The transmitter 13 may be a linear FM, a saturated FM transmitter or other suitable transmitters depending upon the application. In another implementation the encoder 12 is coupled to a bandpass filter 12a which in turn is connected to the transmitter 13.

The receiver system 15 may include any suitable receiver such as an FM receiver 17 for receiving and discriminating the signals received by the receiving antenna 16. The receiver 17 is connected to a decoder 18, according to a fourth embodiment of the present invention (FIG. 14), which demodulates the bipolar PPM signals and provides an output video signal. In a fifth embodiment (FIG. 20), the decoder demodulates dual pulse PPM signal pairs and recovers the original video signal with the noise suppressed.

The decoder 18, according to a sixth embodiment of the invention (FIG. 21), decodes the PPM dispersed signals, such as those generated by the encoder according to the third embodiment. These twice-coded signals are applied to pulse compression lines which recover the pulse pairs from below the noise level. Thereafter, the sixth embodiment functions similarly to the fourth embodiment. The decoder 18 provides suitable analog signals to a utilization network such as a television raster display 19.

Figure 2:
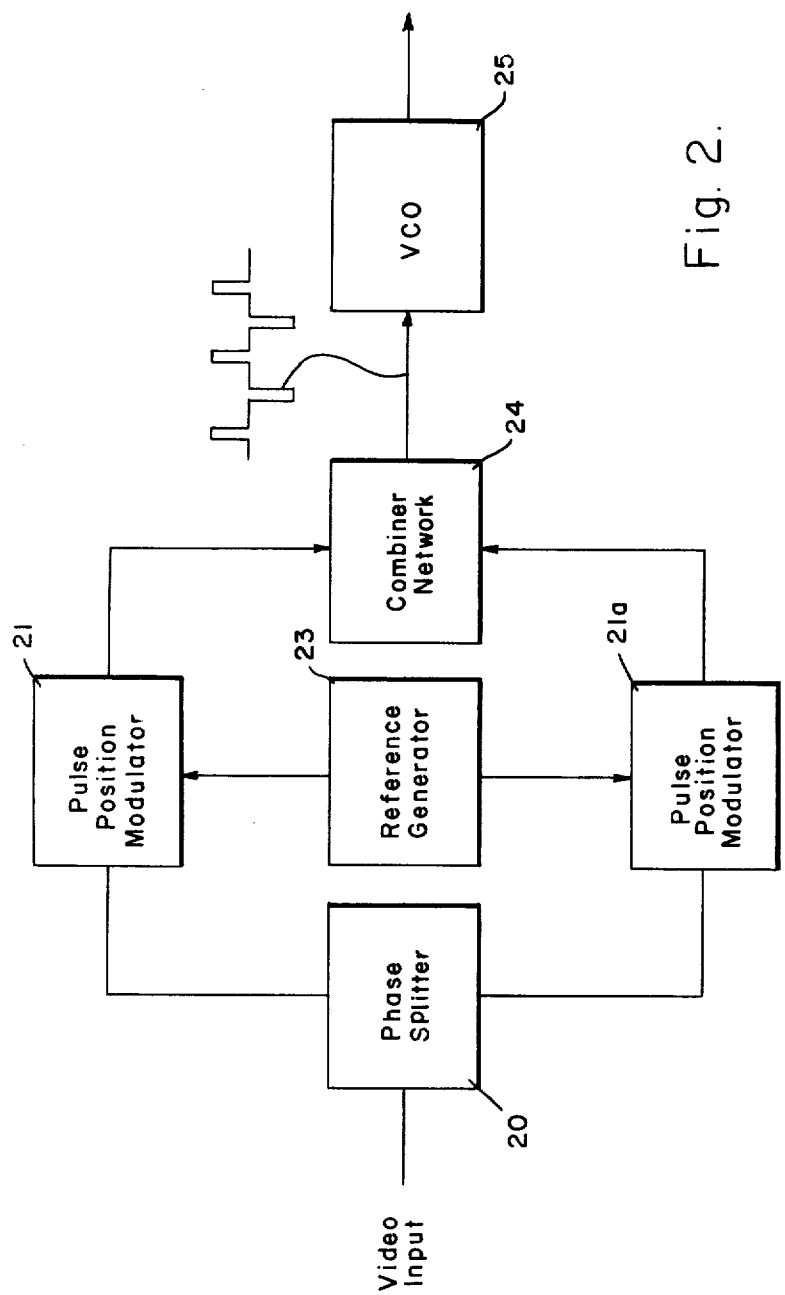
FIG. 2 is a schematic block diagram of a first embodiment of a pulse position modulated encoder according to the invention.

Referring more specifically to FIG. 2, an encoder 12 includes a phase splitter 20 which receives the analog video signals from the source 11. The phase splitter 20 generates a push-pull output signal which is provided at the in-phase and out-of-phase output terminals. The in-phase output signal is provided on the "I" channel while the out-of-phase output signal is provided on the "O" channel. The in-phase output terminal of the phase splitter 20 is connected to the pulse position modulator 21. The out-of-phase output terminal of the phase splitter 20 is connected to the pulse position modulator 21a. A reference generator 23, such as a 5 MHz square wave generator for transmission of video signals, is connected to the modulators 21 and 21a and provides the sampling interval for those modulators. The modulators 21 and 21a are retriggerable multivibrators which are gated by the 5 MHz reference signal. The modulator 21 provides a positive pulse, during the positive or in-phase portion of the sampling signal whose time position corresponds to the instantaneous amplitude of the push-pull signal. The modulator 21a provides a positive pulse during the negative or out-of-phase portion of the sampling signal whose position corresponds to the instantaneous amplitude of the input signal. The output terminals of the pulse position modulators 21 and 21a are connected to a combiner network 24 which adds the in-phase pulses from the modulator 21 and the out-of-phase pulses from the modulator 22 and provides a composite signal having a common DC reference. The composite signals include pairs of positive and negative pulses that are pulse position modulated. The in-phase coded signals are represented by positive pulses while the out-of-phase coded signals are represented by negative pulses. The combiner network 24 is described in greater detail in FIGS. 3 and 4. The pulse modulators 21 and 21a according to FIG. 2 are shown in greater detail in FIGS. 5 and 6.

In operation of the network according to FIG. 2, the camera 11 applies an analog video signal to the phase splitter 20. The phase splitter 20 in turn provides the push-pull analog signal to the pulse position modulators 21 and 21a. The in-phase signal is applied to the modulator 21 while the out-of-phase signal is applied to the modulator 21a. The modulators 21 and 21a are "gated" by the 5 MHz reference generator 23 for sampling the amplitude of the push-pull signal. The modulators 21 and 21a in turn provide output pulses representing the instantaneous amplitudes of the sampled signals.

The "I" channel modulator 21 samples the amplitude of the in-phase portion of the push-pull signal at a 5 MHz rate as controlled by the positive cycle of the trigger signal from reference generator 23. In response to the amplitude of the push-pull signal, a positive pulse is generated having a position corresponding to the amplitude of the analog signal. For example, a pulse may have a time reference position which corresponds to zero video data, and the time position of the pulse may deviate from the reference position depending upon the amplitude of the sampled video signal. The reference position of the output pulse may be at any desired position within the positive sampling period of the generator 23. The reference pulse may occur at the beginning, middle or end of the in-phase sampling period. For purposes of discussion, it is assumed that the reference position is at the center of the in-phase sampling interval corresponding to zero video data. A maximum sampled amplitude corresponds to a positive pulse occurring earlier in the sampling interval, and a minimum sampled amplitude corresponds to a positive pulse occurring later in the sampling interval. Thus the positive output pulse is time or pulse position modulated. The maximum and minimum pulse positions may vary by any suitable amount, such as, for example, 10% of the in-phase sampling time interval.

The "O" channel modulator 21a samples the amplitude of the out-of-phase portion of the push-pull signal at a 5 MHz rate during the out-of-phase interval of the reference generator 23. A positive pulse is then generated having a position corresponding to the amplitude of the sampled point. In a manner similar to the modulator 21, the modulator 22 generates a positive reference pulse having a fixed width and a predetermined time position. For example, the reference pulse, corresponding to zero video data, may occur 180° out of phase with the output pulse from the "I" channel. A pulse corresponding to video data may vary from the reference position depending upon the amplitude of the signal being sampled and may occur at any desired time within the out-of-phase sampling period of the generator 23. For purposes of discussion, it is assumed that the zero video data reference pulse occurs at the center of the negative sampling interval. A maximum sampled amplitude of the negative signal corresponds to a pulse occurring later in the sampling interval. A minimum sampled amplitude corresponds to a pulse occurring earlier in the sampling interval. The pulse position of the out-of-phase pulse may also vary 10%. Generally, since the "I" and "O" channels are operating out-of-phase with each other, maximum sampled amplitudes result in a pair pulse that is displaced the greatest amount from each other. Thus in for a maximum amplitude a pulse from the "I" channel appears to move from the right to the left of the reference position corresponding to a video signal having an increasing amplitude. And, an "O" channel pulse appears to move from the left to the right of the reference position corresponding to a video signal having an increasing amplitude.

The modulators 21 and 21a generate pulses at a 10 MHz rate since the push-pull analog signal is sampled twice during each cycle of the 5 MHz reference generator 23. Thus for each cycle, a pair of spaced pulses is generated in response to the two sampled amplitudes. The pulses are thereby pulse position modulated in response to the video data. In the case where there is zero video data, the pulse pair are a fixed distance apart, such as 180° out of phase. It is noted that each pulse pair contains two bits of video data which are independent of any preceding signal.

The two channels of positive pulses, from the modulators 21 and 21a, are summed by the combiner network 24 which provides a single output channel having alternating positive and negative pulse position modulated pulses. The positive pulses from the "I" channel remain positive pulses at the output terminal of the combiner network 24. However, the combiner network 24 provides negative output pulses in response to the positive pulses from the "O" channel by adjusting the DC reference level voltage. The single channel of bipolar pulse voltage is applied to the voltage-controlled oscillator 25 for transmitting the coded data via the antenna 14. If the pulses are applied to a bandpass filter 12a, the bipolar pulses result in a coded sinewave output signal from the filter 12a. The sinewave is a second coding process whereby the positive and negative portions of the sinewave are modulated in response to the pulse position modulation of the pulse pair.

Referring more specifically to FIG. 3, a combiner network 24 according to FIG. 2 is now described in greater detail. A differential amplifier 30 receives the output pulses from the "I" and "O" channels, modulators 21 and 21a, respectively. The output terminal of the amplifier 30 is connected to a buffer network 31. The buffer 31 is in turn coupled to the VCO 25. The buffer 31 matches the output of the amplifier 30 with the input of the VCO 25.

Referring now to FIG. 4, the combiner 24 according to FIG. 3 is now described in even greater detail. An input network 33 is connected between the modulators 21 and 21a and a differential amplifier 34, such as an operational amplifier. The operational amplifier may be of the Fairchild type μa 733 or the equivalent, which is connected in a differential amplifier configuration. The output terminal of the amplifier 34 is coupled to the input terminal of an emitter follower 36 via a coupling network 35. The emitter follower may be an integrated circuit emitter follower such as a National Semiconductor type LH-0002H or equivalent.

Figure 5:
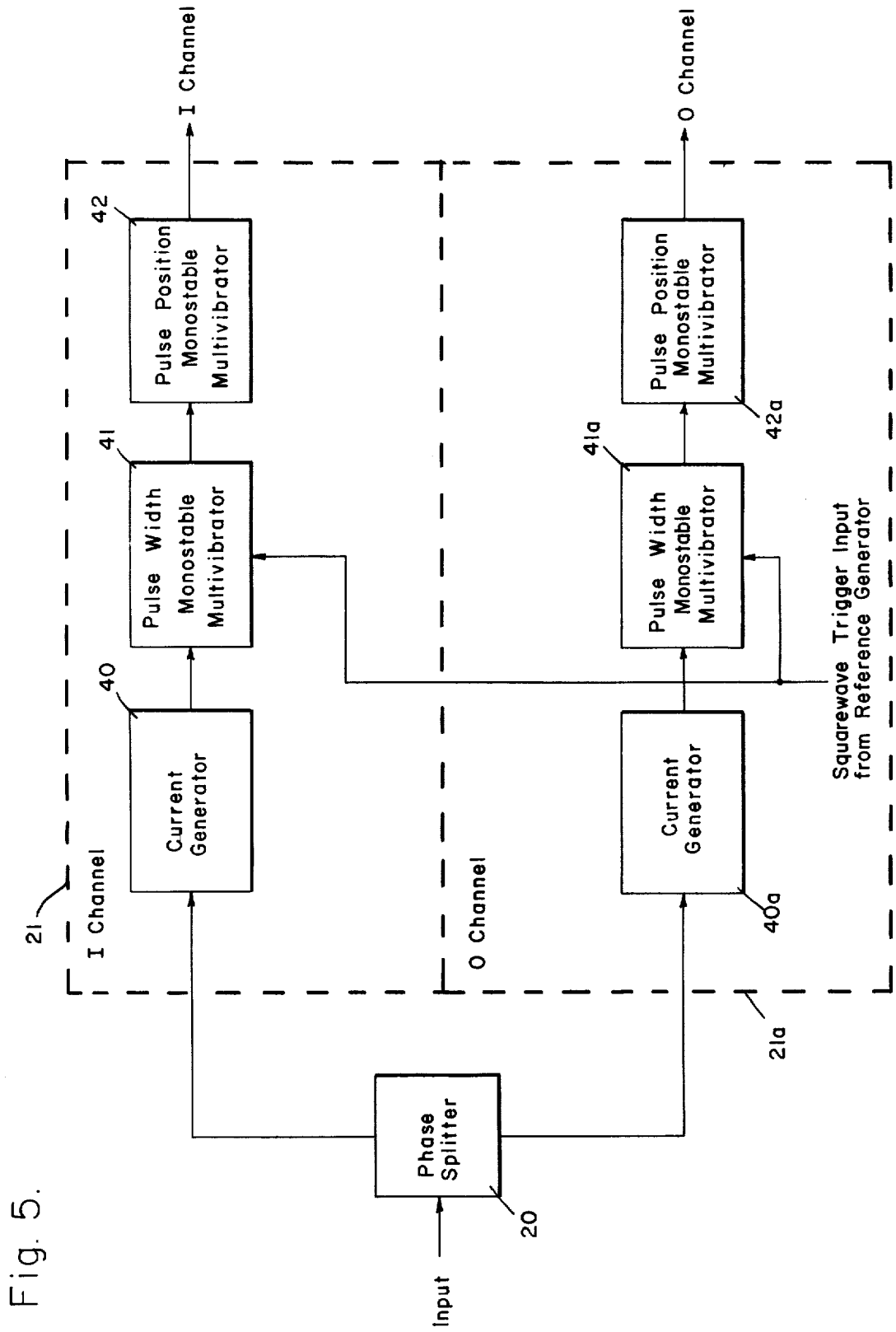
FIG. 5 is a schematic block diagram of a first mechanization of a push-pull pulse position modulator according to FIG. 2.

Referring more specifically to FIG. 5, a first implementation of pulse-position modulators according to FIG. 2 is illustrated in greater detail. The modulators now being described are usable at high frequencies, such as video, and at low frequencies such as audio. The modulator 21 includes a current generator 40 connected to the "I" channel output terminal of the phase splitter 20. The generator 40 provides a constant charging current proportional to the amplitude of the analog video signal. The output terminal of the constant current generator 40 is connected to the input terminal of monostable multivibrator 41. The reference generator 23 is connected to the control terminal of the multivibrator 41. The multivibrator 41 generates the leading edge of a positive output pulse during the rise time of the trigger signal from the reference generator 23. The pulse width is proportional to the amplitude of the current signal from the generator 40. A maximum sampled amplitude of the in-phase signal is translated into a positive pulse having a maximum width, while a minimum sampled amplitude corresponds to a positive pulse having a minimum width.

The output terminal of the multivibrator 41 is connected to a pulse position monostable multivibrator 42 which in turn is connected to the combiner network 24. The multivibrator 42 provides a positive output pulse having a fixed width and a position proportional to the pulse width of the input pulse. The narrow output pulse of the multivibrator 42 is triggered by the leading edge of the input pulse from the multivibrator 41. Since the leading edge of the output pulse from the multivibrator 41 varies or modulates in response to the amplitude of the analog signal, so does the position of the pulse from the multivibrator 42. Thus, a relatively large amplitude corresponds to a pulse occurring early in the in-phase sampling interval while a relatively small amplitude corresponds to a pulse occurring late in the interval.

The pulse-position modulator 21a includes a current generator 40a, similar to the generator 40, connected to the output terminal of the "O" channel of the phase splitter 20. The generator 40a provides a constant charging current proportional to the amplitude of the analog video signal it receives from the phase splitter 20. The output terminal of the generator 40a is connected to the input terminal of a pulse width multivibrator 41a, similar to the multivibrator 41. The reference generator 23 is connected to the control terminal of the multivibrator 41a. The output terminal of the multivibrator 41a is connected to the input of a terminal of a monostable multivibrator 42a, similar to the multivibrator 42. The multivibrator 41a generates a positive output pulse, having a variable width during the negative half-cycle trigger signal from the reference generator 23. The pulse has a width proportional to the amplitude of the current signal from the generator 40a. A maximum sampled amplitude of the negative signal is translated into a pulse having a minimum width, while a minimum sampled amplitude corresponds to a negative pulse having a maximum width similar to the multivibrator 41.

The output terminal of the multivibrator 42a is connected to the second input terminal of the combiner network 24. The multivibrator 42a provides a positive output pulse having a fixed width and a position proportional to the pulse width of the input pulse. The translation from pulse width modulation to pulse position modulation in the "O" channel is accomplished in a fashion that is similar to the modulator 21. The narrow output pulse of the multivibrator 47 is triggered by the trailing edge of the output pulse of the multivibrator 41a. Since the trailing edge of the pulse from the multivibrator 41a is modulated in response to the amplitude of the analog signal, so to is the position of the pulse from the multivibrator 47. Thus a relatively large amplitude corresponds to a pulse occurring late in the out-of-phase sampling interval while a relatively small amplitude corresponds to a pulse occurring early in the interval. It should be noted that the out-of-phase analog signal from the phase splitter 20, which is applied to the "O" channel, varies inversely to the signal applied to the "I" channel.

Therefore two data points per cycle are sampled and a pulse width modulated pair of pulses is generated corresponding to the amplitude of sampled points. The pulse width modulation is then translated into pulse position modulation. A more detailed description of the "I" and "O" channels may be found in the schematic of FIG. 6.

Figure 6:
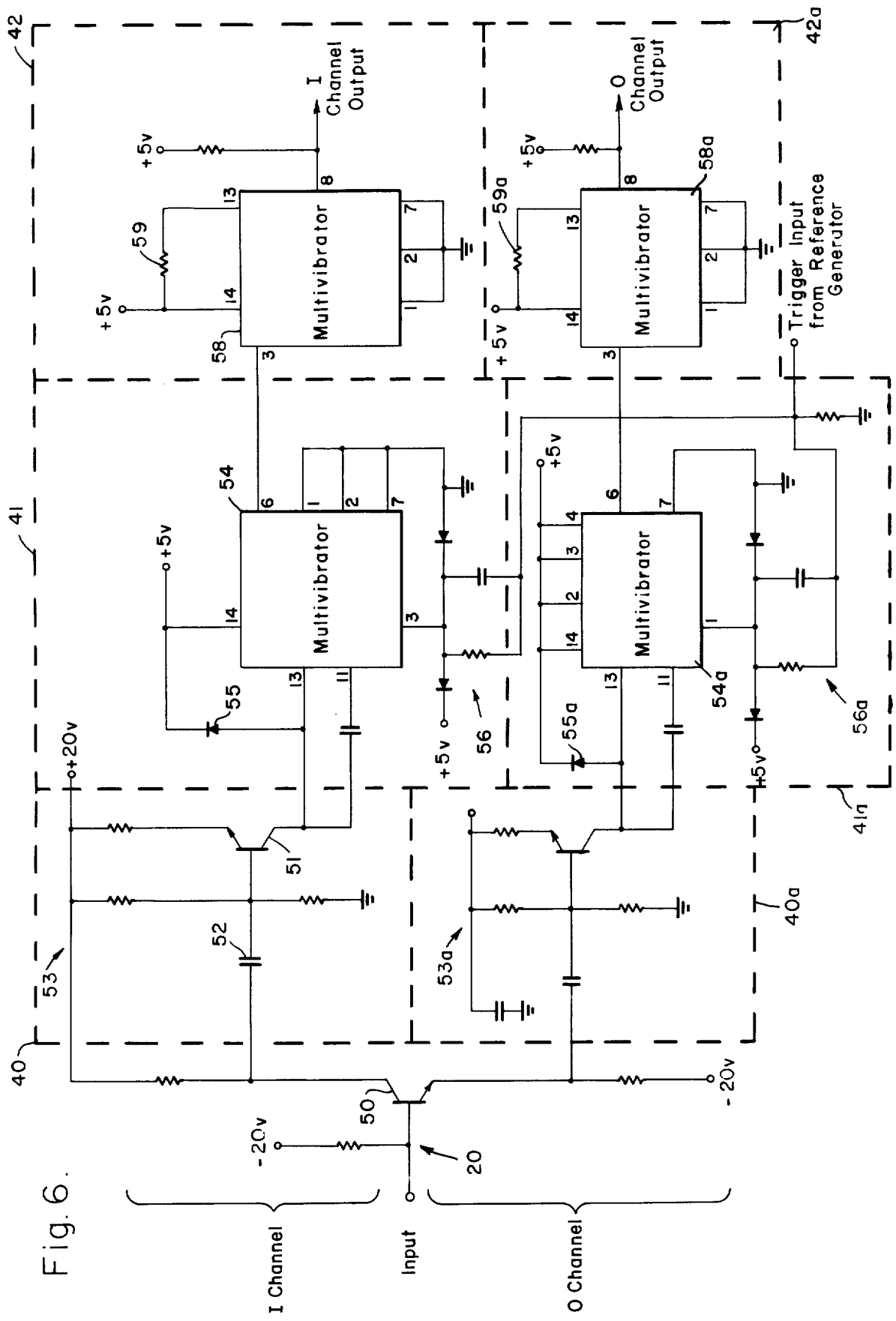
FIG. 6 is a schematic circuit diagram of a push-pull pulse position modulator according to FIG. 5.

Referring more specifically to FIG. 6, the schematic circuit diagram illustrates a first implementation of a modulator network applicable to audio frequencies.

The phase splitter 20 may be an NPN transistor 50 which receives the audio signal on the base electrode. The transistor 50 provides the push-pull signals in response to the input audio signals. The collector electrode of the transistor 50 is coupled to the input terminal of the current generator 40, illustrated here as an NPN transistor 51, by a coupling capacitor 52. A bias network 53 is connected to a bias voltage such as +20 VDC, and provides the bias voltages to the transistors 50 and 51. The collector electrode of the transistor 51 is coupled to terminals 11 and 13 of the monostable multivibrator 41, illustrated here as a retriggerable monostable multivibrator 54. The numerals surrounding the multivibrators 54 and 58 refer to the pin numbers of the particular multivibrators. A diode 55 is connected between terminals 13 and 14 for providing the proper bias at terminal 13. Terminal 14 is also connected to a bias voltage such as +5 VDC. A bias network 56 is connected to various terminals of the multivibrator 54 as shown. The reference generator 23 is coupled to terminal 3 of the multivibrator 54. The multivibrator 54 may be a Fairchild catalog No. 9601, for example.

The output terminal 6 of the multivibrator 54 is connected to input terminal 3 of the retriggerable monostable multivibrator 58, of the same type as multivibrator 54. A resistor 59 is connected between terminals 13 and 14 for adjusting the width of the output pulse. Terminal 14 is also connected to the +5 VDC bias voltage. The output pulse from the multivibrator 59 is provided on terminal 8.

Referring now to the "O" channel of FIG. 6, the emitter electrode of transistor 50 is coupled to the current generator 40a which is similar to the "I" channel generator 40 and will therefore not be described in detail. The generator 40a is in turn coupled to a retriggerable monostable multivibrator 54a which is similar to the multivibrator 54 and will therefore not be discussed in detail. The trigger signal, from the reference generator 23, is applied to terminal 1 of the multivibrator 54a, whereas the trigger signal is applied to terminal 3 of the multivibrator 54. The multivibrator 54a is connected to input terminal 3 of the multivibrator 58a which is identical to the multivibrator 58 and will, therefore, not be discussed.

The network illustrated in FIG. 6 for audio frequencies may be applicable to video frequencies if a suitable high frequency monostable multivibrator, such as an Advance Microdevices, Inc., catalog number AM26S02, were utilized for the multivibrators 54, 54a, 58 and 58a.

Figure 7:
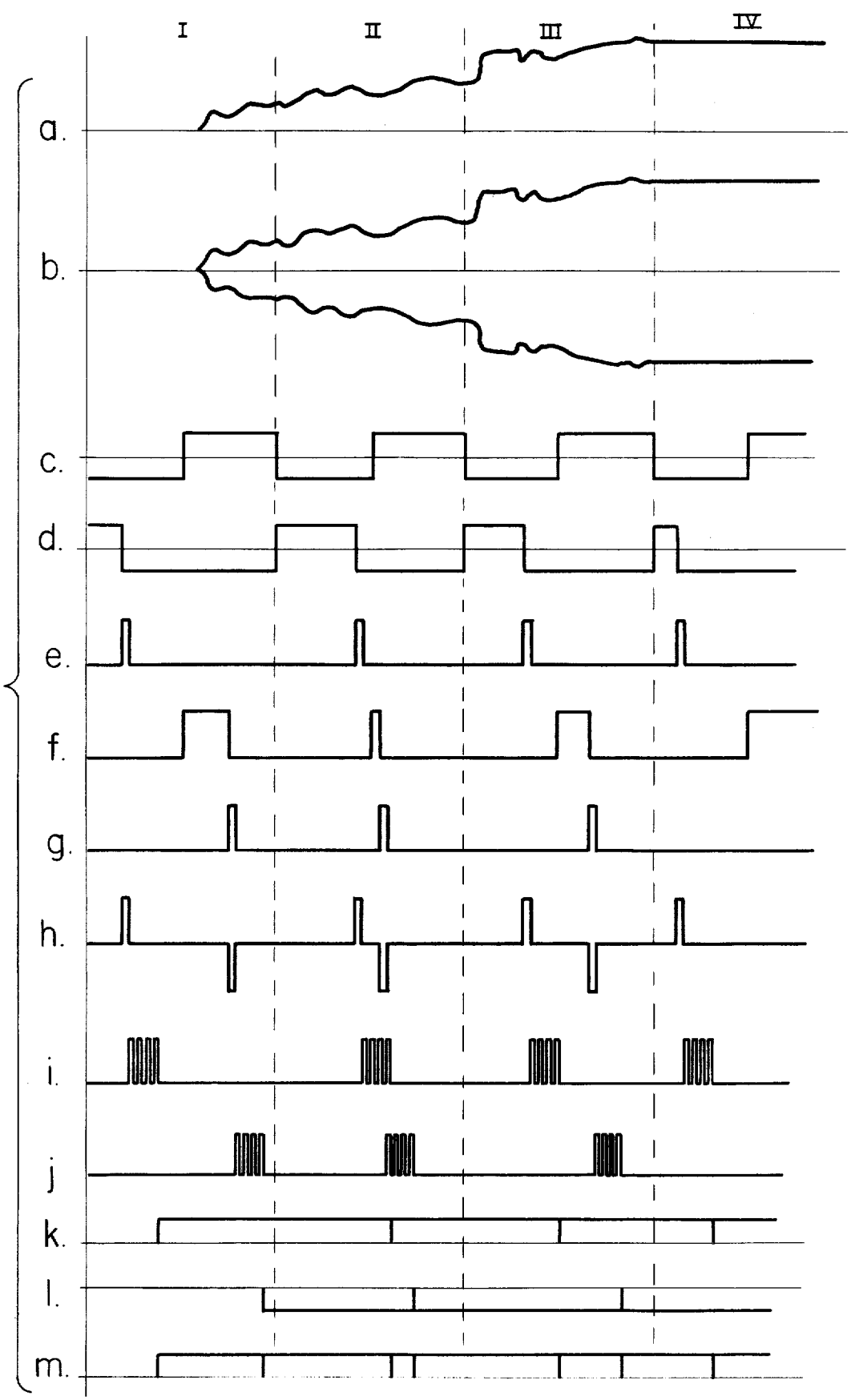
FIG. 7 is a diagram illustrating the input signal and timing waveforms 7a–7m of the circuit according to the invention.

The operation of the circuit according to FIG. 6 is now described with reference to that figure and with reference to FIG. 7. An analog input signal is applied to the input terminal of the phase splitter transistor 50 herein as illustrated in FIG. 7a. The phase splitter 50 in turn provides a push-pull output signal having an in-phase channel and an out-of-phase channel which are applied to current generating transistors 51 and 51a respectively, illustrated in FIG. 7b. FIG. 7c illustrates the square-wave sampling frequency which is applied to the multivibrators 54 and 54a for providing a predetermined sampling interval. The current generator 51 provides a constant current in response to the input signal from the transistor 50. The current flow through the transistor 51 determines the period of the output pulse from the multivibrator 54. Thus, the greater the current flow the shorter the output pulse, and vice versa. The sampling time is during the fall time of the pulse from the reference generator 23. For example, a zero data signal applied to the transistor 51 results in an output pulse from the multivibrator 54 that is approximately 50 nsecs long, as illustrated in the first cycle (I) of FIG. 7d. The multivibrator 58 in response to the fall time of the output pulse from the multivibrator 54 provides a narrow output pulse as illustrated in FIG. 7e. Cycles II, III and IV of FIG. 7d and 7e illustrate pulses generated in response to the varying amplitude of the analog signal. Thus the "I" channel pulse-position modulates an output pulse in response to an input signal being sampled at 5 MHz.

The "O" channel of the encoder functions in a manner similar to that of the "I" channel and therefore will not be described in any greater detail. FIGS. 7f and 7g illustrate the pulse-width modulation and pulse-position modulation respectively of the encoded signal from the "O" channel. FIG. 7h illustrates the output signal of a combiner network 28.

Figure 8:
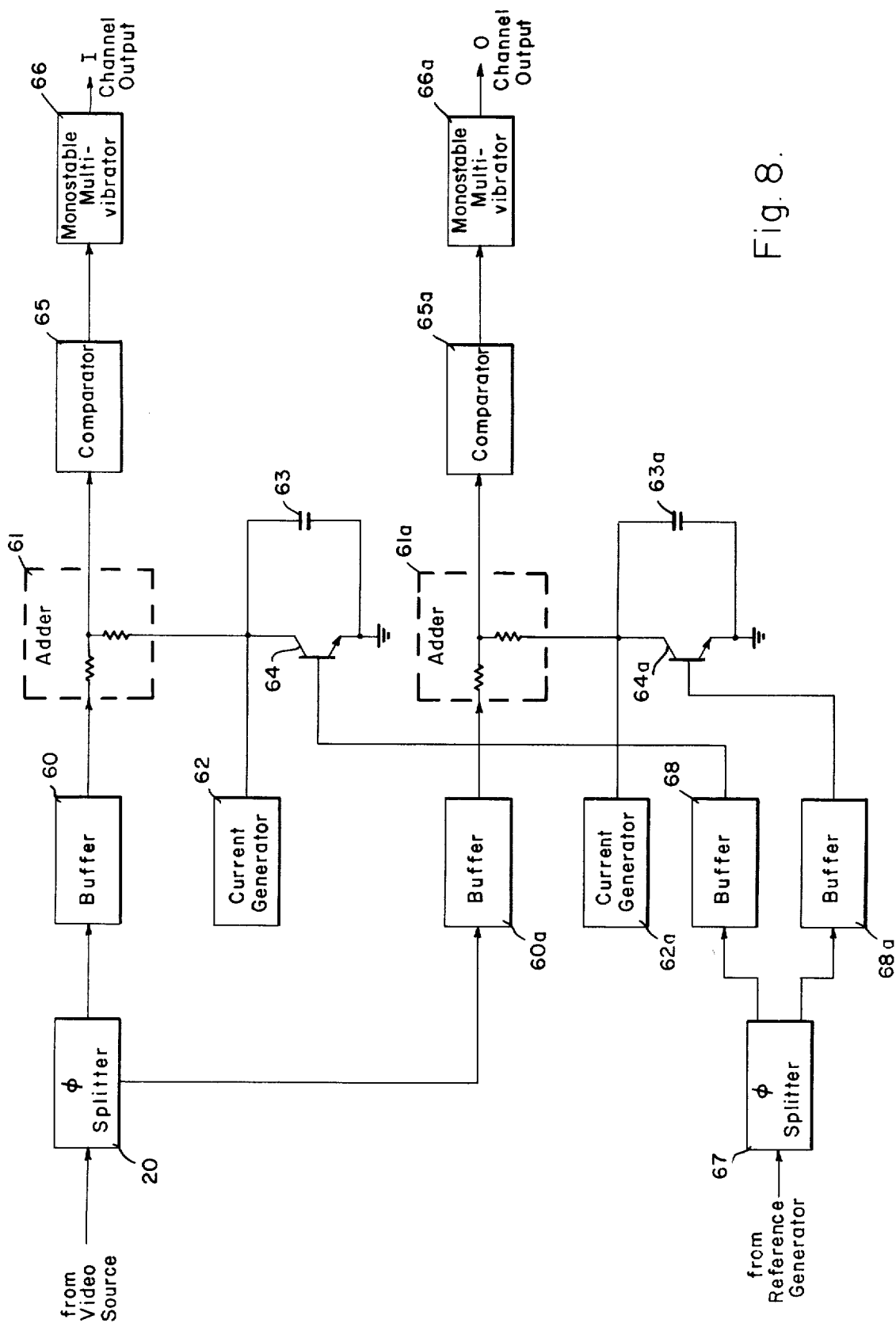
FIG. 8 is a schematic block diagram of a second mechanization of a push-pull pulse position modulator according to FIG. 2.
Figure 9:
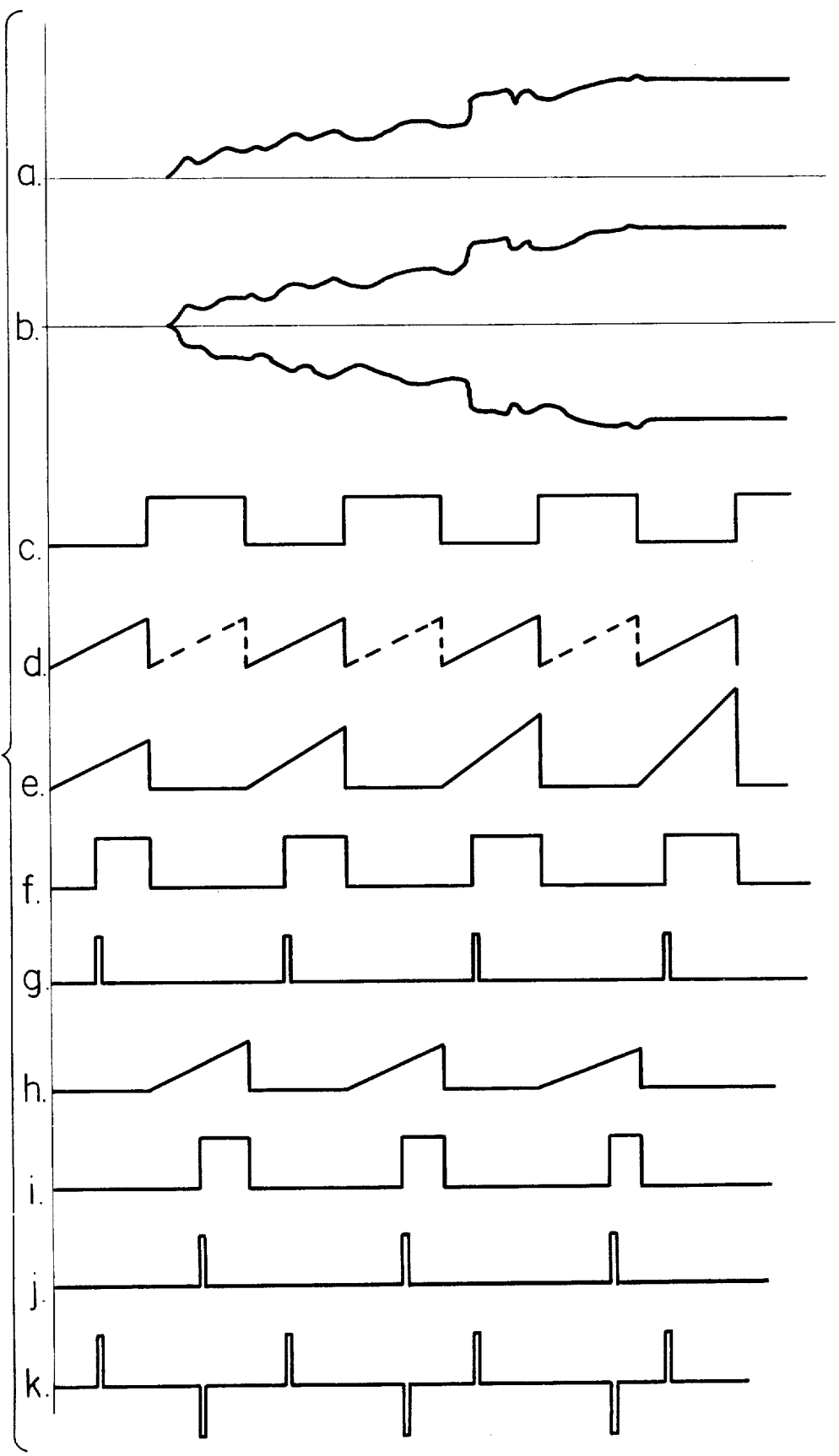
FIG. 9 is a diagram illustrating the input signal and timing waveforms of the operation of the invention according to FIG. 8.

Referring now to FIG. 8, the schematic block diagram illustrates a second implementation of the first embodiment of the invention. The following description applies to a circuit operable at video frequencies.

The phase splitter 20 receives the video signals from a camera 11. The in-phase output terminal of the phase splitter 20 is connected to the input terminal of a buffer 60 which may be a complementary pair of emitter follower transistors. The output terminal of the buffer 60 is connected to the first input terminal of a resistive adder 61. A current generator 62 is connected to the second input terminal of the adder 61, to a storage capacitor 63 and to a reset transistor 64. The current generator 62 charges the capacitor 63 with a constant current during the positive half cycle of the reference generator 23. Thus the ramp function of the capacitor, as it is being charged, is added to the video signal from the buffer 60 and the summed signals are provided at the output terminal of the adder 61. The output signal from the adder 61 is a ramp function whose slope is determined by the amplitude of the sampled video signal. For a relatively large video signal the ramping output signal has a greater slope than for a smaller video signal which produces a lesser slope. At the end of the positive half cycle the transistor discharges the capacitor 63 and resets the adder 61.

The output terminal of the adder 61 is connected to the input terminal of a comparator 65 which includes a threshold circuit. The threshold circuit sets the voltage level which initiates an output signal from the comparator 65. The comparator 65 provides an output pulse in response to the input ramp signal. A ramp signal having a greater slope will trigger the output pulse earlier than a ramp function having a smaller slope. The period of the comparator 65 is set so that the output pulse terminates at a predetermined time regardless of when it commenced. Usually a duty cycle of 90% of the positive half of the reference signal is adequate. Thus the leading edge of the output pulse from the comparator 65 is modulated in response to the input ramp function.

The output terminal of the comparator 65 is connected to the input terminal of a monostable multivibrator 66. The multivibrator 66 provides an output pulse having a fixed width in response to the leading edge of the pulse width modulated signal from the comparator 65. Thus the output signal from the multivibrator 66 is pulse position modulated in response to the pulse width modulated signal from the comparator 65. The multivibrator 66 may be a Fairchild catalog No. 9601, or equivalent.

Referring again to the phase splitter 20, the out-of-phase output terminal is connected to a buffer 60a, similar to the buffer 60, in the "O" channel. The output terminal of the buffer 60a is connected to the first input terminal of a resistive adder 61a, similar to the adder 61. A current generator 62a, similar to the generator 62, is connected to the second input terminal of the adder 61a, to a storage capacitor 63a, and to a reset transistor 64a. The current generator 62a charges the capacitor 63a with a constant current during the negative half cycle of the reference generator 23. The adder 61a functions similarly to the adder 61 but 180° out of phase.

The output terminal of the adder 61a is connected to the input terminal of a comparator 65a having a threshold circuit. The output terminal of the comparator 65a is connected to the input terminal of a monostable multivibrator 66a which provides the pulse position modulated signal.

The networks within the "O" channel are identical to the networks within the "I" channel and therefore were not discussed in greater detail.

Referring now to the trigger network, the reference generator 23 is connected to the input terminal of a phase splitter 67 which provides out-of-phase and in-phase reference signals to buffers 68 and 68a, respectively. The buffer 68 is connected to the base electrode of the reset transistor 64 for controlling its conduction and thereby the discharge of the capacitor 63. The transistor 64 is at cut-off during the in-phase period of the reference generator 23. The buffer 68a is connected to the base electrode of the reset transistor 64a for controlling its conduction and thereby the discharge of the capacitor 63a. The transistor 64a is at cut-off during the out-of-phase period of the reference generator 25.

Thus, push-pull pulse position modulated signals are provided by the "I" and "O" channels in response to the incoming video signal and the signal from the generator 25.

The operation of the invention according to FIG. 8 is now described with reference to that figure and with reference to FIGS. 9a–9k. A video input signal is applied to the phase splitter 20. An arbitrary input analog signal is illustrated in FIG. 9a. The phase splitter 20 provides in-phase and out-of-phase signals illustrated in FIG. 9b. The in-phase signal is applied to the buffer 60 which in turn applies the video signal to one input terminal of the adder 61. The reference generator 23 is connected to the phase splitter 67 which is for controlling the conduction of the reset transistors 64 and 64a. During the first half-cycle signal from the reference generator, transistor 64 is at cut-off and the current generator 62 is providing a constant ramp current to the capacitor 63 illustrated by the solid ramping line of FIG. 9d. The signal from the current generator 62 is applied to the second input terminal of the adder 61 which provides a ramp output signal having a slope that is determined by the sum of the incoming video signal and the signal from the current generator 62. The variable slope ramp output signal from the adder 61 is illustrated in FIG. 9e. The variable ramping signal from the adder 61 is applied to the comparator 65 which includes a threshold circuit. The comparator 62 provides a pulse output signal whose leading edge is determined by a threshold voltage level being exceeded. Thus an input signal to the comparator 65 having a small slope will exceed the threshold later in time than a ramp signal having a greater slope. The variable pulse-width output signal of the comparator 65 is illustrated in FIG. 9f. The pulse-width modulated signal from the comparator 65 is applied to the multivibrator 66 whose output pulse is triggered by the leading edge of the pulse-width modulated signal from the comparator 65. Thus a pulse-position modulated signal is provided by the multivibrator 66, as illustrated in FIG. 9g. The transistor 64 is placed in conduction by the phase splitter 67 during the second half of the sampling cycle, thereby discharging the capacitor 63 and resetting the "I" channel for a subsequent sampling cycle.

The "O" channel functions identically to the "I" channel but is 180° out of phase therewith. The waveforms for the "O" channel are illustrated in FIGS. 9h, 9i, and 9j. The pulse-position modulated pulses from the "I" and "O" channels are applied to the combiner network 24 which provides PPM pairs as illustrated in FIG. 9k.

Referring now to FIG. 10, a second embodiment according to the present invention is now described which provides improved noise-cancelling capability by coding an analog input signal with two PPM pulse pairs. The second embodiment includes a phase splitter 70 similar to the phase splitter 20 previously described. The splitter 70 provides a push-pull output signal on an in-phase output terminal connected to the input terminal of a pulse position modulator 71. The modulator 71 has in-phase and out-of-phase output channels which are connected to the first and second input terminals of a combiner network 72, respectively. The modulator 61 provides a first pair of PPM pulses in response to the input analog signal.

The out-of-phase output terminal of the phase splitter 70 is coupled to the input terminal of a modulator 71a, similar to the modulator 71. The modulator 71a has in-phase and out-of-phase output channels which are connected to the third and fourth input terminals of the combiner network 72. The modulator 71a provides a second pair of PPM pulses in response to the input signal. The second pulse pair is out of phase with the first pair, and the result of such phasing is that when the pulse pairs are demodulated the noise cancels, since it is in phase, but push-pull. The signals do not cancel since they are out of phase.

The modulator 71 includes a phase splitter 20, similar to the phase splitter described above, which provides a push-pull output signal in response to the input signal from the phase splitter 70. The in-phase output terminal of the phase splitter 20 is connected to the input terminal of a modulator 21 similar to the modulator described in FIG. 2. The reference generator 23 is connected to the modulator 21 for providing the sampling interval. The output terminal of the modulator 21 is connected to the first input terminal of the combiner network 72 and provides the in-phase output pulses to the combiner 72.

The out-of-phase output terminal of the phase splitter 20 is connected to the input terminal of a modulator 21a which is similar to the modulator 21. The reference generator 23 is also coupled to the modulator 21a. The output terminal of the modulator 21a is connected to the second input terminal of the combiner network 72. The modulator 21a provides the out-of-phase output pulses to the combiner 62. The modulator 71 functions identically to the circuit described in FIGS. 5, 6 or 7 and therefore will not be described here in any greater detail. The combiner network 72 is described in greater detail in FIG. 11.

The pulse position modulator 71a is similar to the 71 and will therefore be described only briefly. The modulator 71a includes a phase splitter 20a, which is similar to the phase splitter 20 in the modulator 71. The phase splitter 20a provides an in-phase and an out-of-phase channel. The term signal phase refers to the phase of the signal from the phase splitter 20a with reference to the incoming analog signal to the phase splitter 70. The in-phase output terminal of the phase splitter 20a is connected to the modulator 21b, which is identical to the modulator 21. The output terminal of the modulator 21b is connected to the second in-phase input terminal of the combiner 72. The out-of-phase output terminal of the phase splitter 20a is connected to the modulator 21c which is identical to the modulator 21. The output terminal of the modulator 21c is connected to the second out-of-phase input terminal of the combiner 72. The modulators 21b and 21c receive their trigger signal from a multivibrator 73 instead of the reference generator 23 as do the modulators 21 and 21a.

A monostable multivibrator 73 receives the trigger signal from the reference generator 23. The multivibrator 73 may have a 60 nsecs period when the system is being operated at video frequencies and the reference generator provides a 5 MHz signal. The output terminal of the multivibrator 73 is connected to the input terminal of a second monostable multivibrator 74 which may have a period of 100 nsecs. The output terminal of the multivibrator 74 is connected to the modulators 21b and 21c. The multivibrators 73 and 74 shift the sampling tires of the modulator 61a such that a second pair of pulses are generated 180° out of phase with the first pair of pulses.

The combiner network 72 provides a positive output in response to the in-phase channel of the modulator 21 and provides a negative output pulse in response to the out-of-phase channel of the modulator 21a. The in-phase channel of the modulator 21b results in a positive output pulse from the combiner network 72. The pulses from the out-of-phase channel of the modulator 71a are translated by the combiner network 72 into negative output pulses. Thus two pairs of output pulses are provided in response to each cycle of the reference generator 23.

Figure 11:
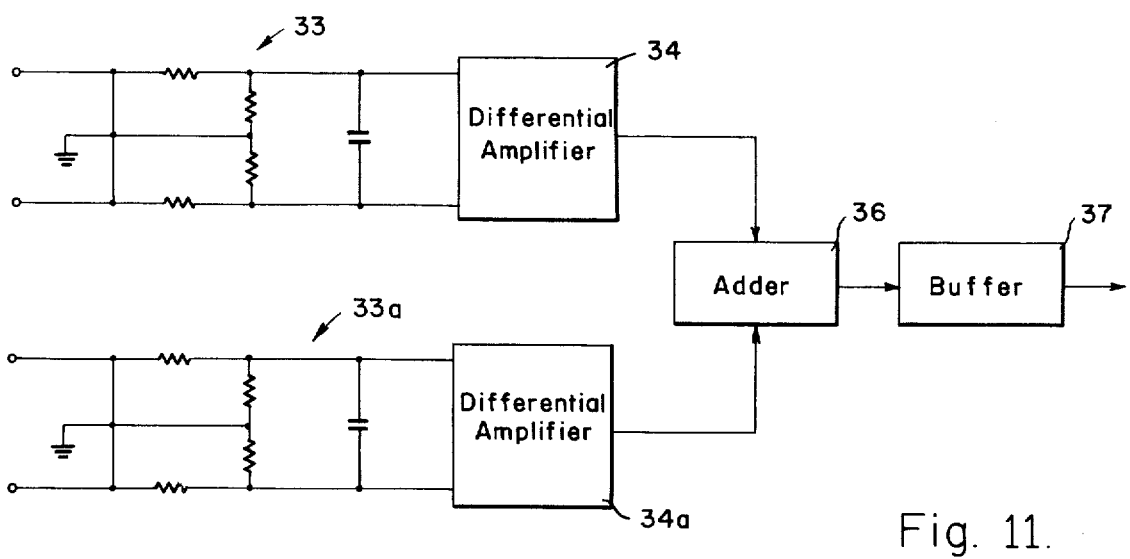
FIG. 11 is a schematic circuit diagram of a combiner network according to FIG. 10.

Referring more specifically to FIG. 11, a combiner network 72 according to FIG. 10 is now described. Since the combiner networks in FIGS. 4 and 10 are similar, the same reference designation numerals will be used wherever applicable. The combiner network 72 includes an input circuit 33 providing input terminals for the in-phase and out-of-phase channels of the modulator 71. The input circuit 33 is connected to the input terminals of a differential amplifier 34. The output terminal of the amplifier 34 is connected to a resistive adder 76 which in turn is connected to an emitter follower buffer 36. The combiner network 72 further includes a second input circuit 33a, similar to the input circuit 33, which receives the in-phase and out-of-phase output signals from the modulator 71a. The input circuit 33a is connected to the input terminals of a differential amplifier 34a, similar to the amplifier 34. The output terminal of the amplifier 34a is connected to the second input terminal of a resistive adder 76.

The differential amplifier 34 provides first pairs of positive and negative pulses in response to the in-phase and out-of-phase output signals from the modulator 71.

The modulator 34a provides second pairs of positive and negative pulses in response to the in-phase and out-of-phase channels from the modulator 71a. The second pairs of pulses are displaced by 90° in phase from the first pair of pulses. The adder 76 combines the two series of bipolar pulses, which are then applied to the emitter follower buffer 36.

Figure 12:
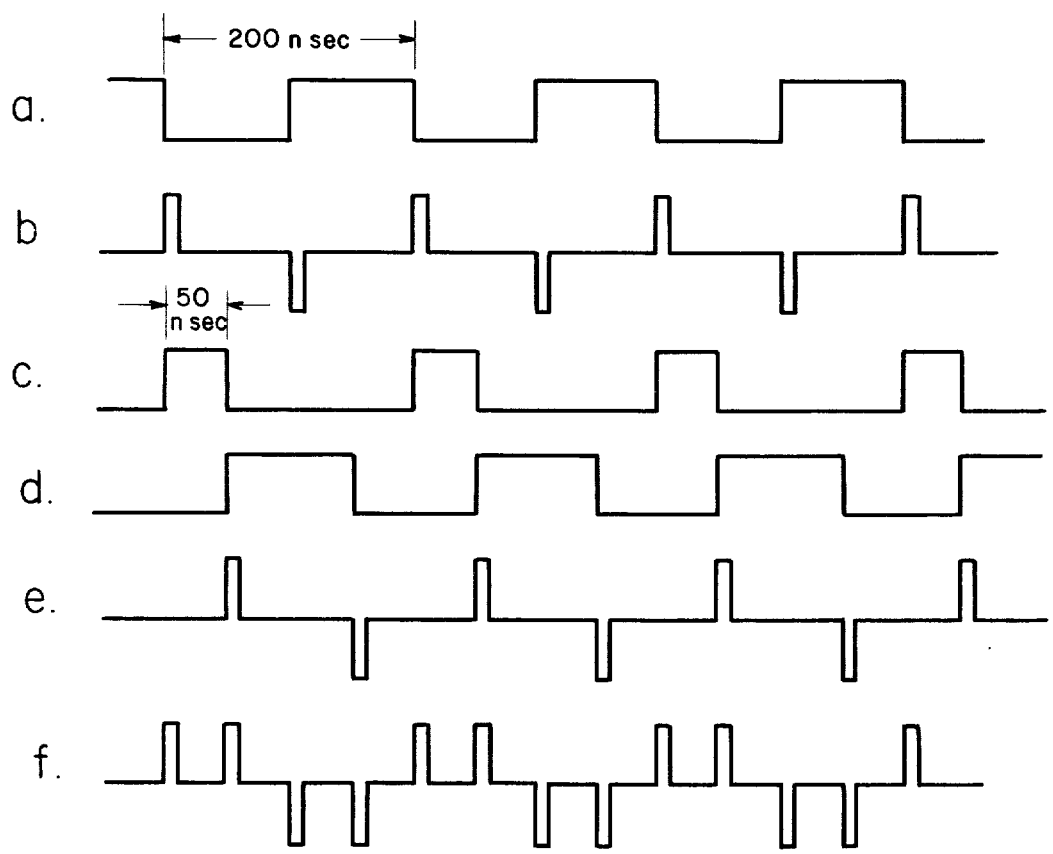
FIG. 12 is a diagram illustrating the timing waveforms 12a–12f of the invention according to FIGS. 10 and 11.

The operation of the invention according to FIG. 10 will now be described with respect to that figure and with respect to FIG. 12. An analog input signal is applied to the phase splitter 70 which provides push-pull output signals on the in-phase and out-of-phase terminals to modulators 71 and 71a. The phase splitter 20 in the modulator 71 receives the in-phase analog signal and in turn provides an in-phase and out-of-phase signal to the modulators 21 and 21a. Thereupon the modulators 21 and 21a function in a manner similar to the modulators described in FIGS. 2, 5, and 6 and therefore will not be described in any greater detail. The modulator 71 provides a pair of positive pulses which are pulse-position modulated in response to the sampled analog signal during each sampling interval; i.e., each cycle. These PPM pulse pairs are applied to the combiner network 72.

The phase splitter 20a in the modulator 71a receives the out-of-phase analog signal and provides an in-phase and an out-of-phase signal, with respect to the input signal to the phase splitter 70. Thereupon the modulators 21b and 21c function similarly to the modulators 21 and 21a with the exception that the incoming analog signal is sampled 90° out of phase with the sampling of the modulator 71. The 90° phase shift is accomplished by the monostable multivibrators 73 and 74. The reference generator 23 provides a square-wave output pulse as illustrated in FIG. 10a. At video frequencies the generator 23 operates at 5 MHz and the period of the square-wave pulse is 200 nsecs. FIG. 12b illustrates the output pulses from the combiner 72 in response to the modulator 71, herein referred to as first pulse pairs. It is noted that the positive output pulses of the first pulse pairs from the combiner 72 are triggered by the "negative-going" edge of the sampling pulses from the reference generator 23. The negative pulses of the first pulse pairs from the combiner 72 are triggered by the "positive-going" edges of the pulses from the reference generator 23. FIG. 12c illustrates the output pulse from the 50 nsec monostable multivibrator 73 which is triggered by the "negative-going" edge of the output pulse of the reference generator 23. The "negative-going" edge of the pulse from the multivibrator 73 in turn triggers the 100 nsec monostable multivibrator 74. Thus the signal applied to the modulator 71a is sampled at a 5 MHz rate 90° out of phase with the sampling by the modulator 71. FIG. 9e illustrates the output pulses from the combiner 72 in response to the in-phase and out-of-phase channels of the modulator 71a, herein referred to as second pulse pairs. It is noted that the positive pulses of the second pulse pairs are triggered by the "positive-going" edge of the sampling pulse from the multivibrator 74 while the negative pulses are triggered by the "negative-going" edges. FIG. 12f illustrates the combined output signal of the first and second pulse pairs which appears at the output of the combiner network.

Figure 13:
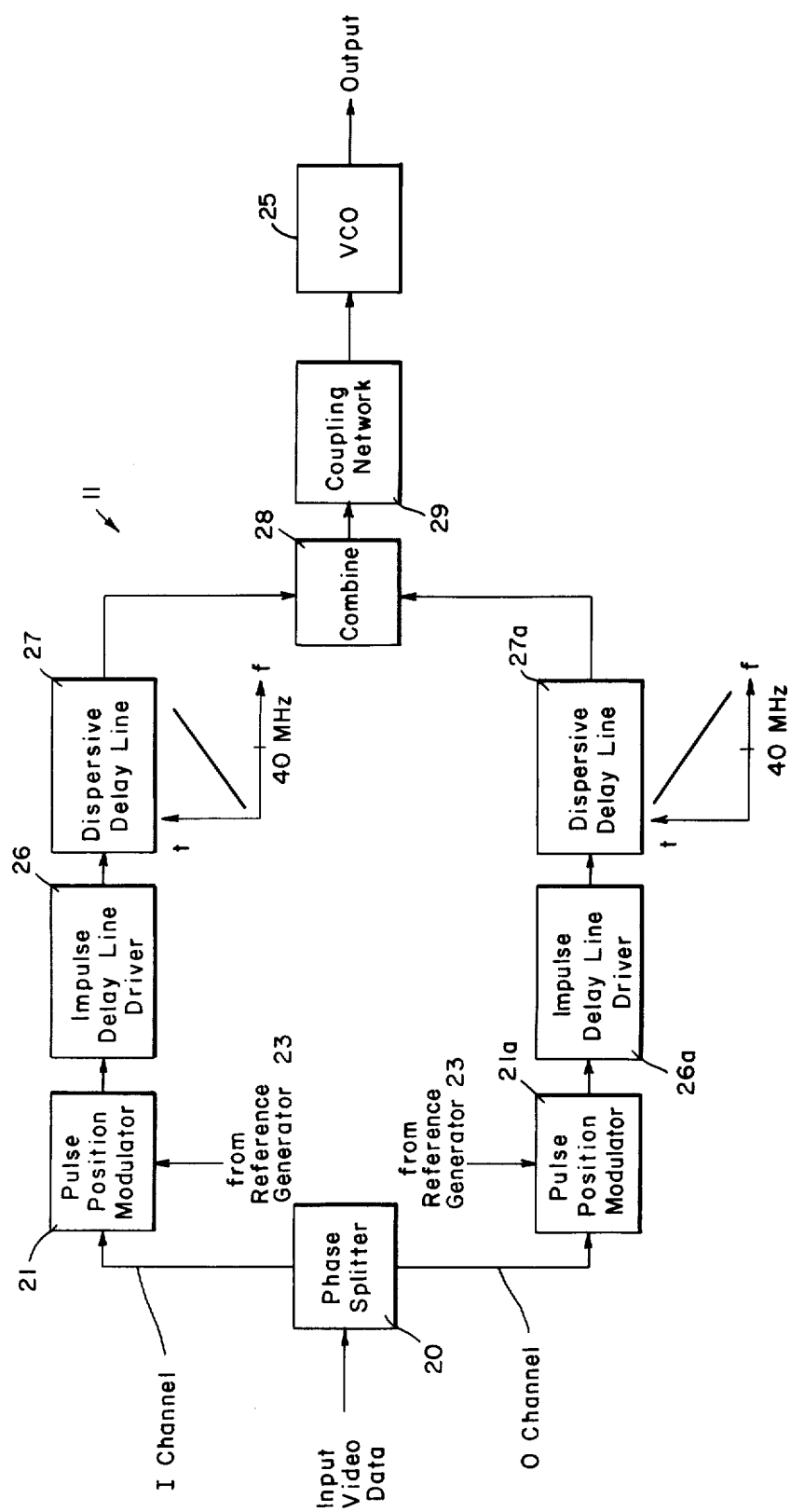
FIG. 13 is a schematic block diagram illustrating an encoder utilizing pulse position modulation and frequency dispersion according to a third embodiment of the present invention.

Referring now to FIG. 13, the third embodiment according to the present invention is now described. The encoder 12 includes a phase splitter 20 which receives the analog signals from the video camera 11 and provides a push-pull analog signal to the modulators 21 and 21a. The phase splitter 20 and the modulators 21 and 21a are similar to their corresponding counterparts described in FIGS. 2, 5 and 6, depending on the application, and therefore will not be described in detail.

The output terminal of the modulator 21 in the "I" channel is connected to an impulse delay line driver 26. The output terminal of the driver 26 is connected to the input terminal of a dispersive delay line 27. The driver 26 provides the required output impulses which are used to trigger the dispersed output signal from the delay line 27. The driver 26 supplies an impulse signal containing all the frequencies which the delay line 27 can utilize. Any suitable delay line driver, such as Fairchild catalog No. MA733 in an oscillator configuration, may be used.

The dispersive delay line 27 may be a surface acoustic wave device which has a transfer function with a positive slope. An impulse signal applied to the delay line 27 results in an output pulse that is "stretched" in time and contains the lowest frequencies at the leading edge and the highest frequencies at the trailing edge of the pulse. In other words, the low frequencies are delayed least, while the high frequencies are delayed most. The relationship of a time versus frequency transfer function is illustrated below the delay line 27 in FIG. 13. It is noted that in a video application the delay line has a center frequency of 40 MHz, a bandwidth of 13 MHz, and a delay of 130 μs. An example of a suitable delay line may be found in U.S. Pat. No. 3,899,212 entitled "Circulative Surface Acoustic Wave Device."

Referring again to the modulator 21a, the output terminal of that modulator is connected to the input terminal of an impulse delay line driver 26a similar to the delay line driver 26. The output terminal of the driver 26a is connected to the input terminal of a dispersive delay line 27a having a transfer function with a negative slope; i.e., the conjugate slope of the delay line 27. The dispersed output pulse from the delay line 27a contains the highest frequencies at the leading edge while the lowest frequencies are at the trailing edge. That is, the highest frequencies are delayed the least, while the lowest frequencies are delayed the most. The transfer function is illustrated immediately below the delay line 27a. The dispersive delay line 27a may be of the same type as the delay line 27.

The output terminal of the first delay line 27 is connected to the first input terminal of an IF summer network 28. The output terminal of the second delay line 27a is connected to the second input terminal of the 20 which combines the positive and negative "chirped" pulses from the dispersive delay lines 27 and 27a and provides a complex output waveform. The IF summer 28 may be of the type such as a Merrimac catalog number PD 20-58. The output terminal of the combiner 28 may be connected to a suitable coupling network 29 for controlling a VCO25.

The operation of the third embodiment, to a certain extent, is identical to the operation of the first and second embodiments. The invention according to FIG. 13 generates a pair of PPM pulses in response to each cycle of the sampling frequency. The pulse pairs are coded by applying the "I" channel pulses to the impulse delay line driver 26 which provides a series of impulses illustrated in FIG. 7i. The delay line 27 responds by providing a dispersed output pulse having a positive-sloped frequency profile. The dispersed pulse is illustrated in FIG. 7k. The dispersed pulse is applied to the summer 28.

The pulses generated by the "O" channel are applied to the impulse delay line driver 26a which provides a series of impulses which are identical to the pulses generated by the driver 26. The "O" channel impulses are illustrated in FIG. 7j. The delay line 27a responds by providing a dispersed output pulse having a conjugate or negative frequency profile illustrated here as FIG. 7(l). The dispersed pulses of the "O" channel are applied to the summer network 28 whose output signal is illustrated in FIG. 7m.

Figure 14:
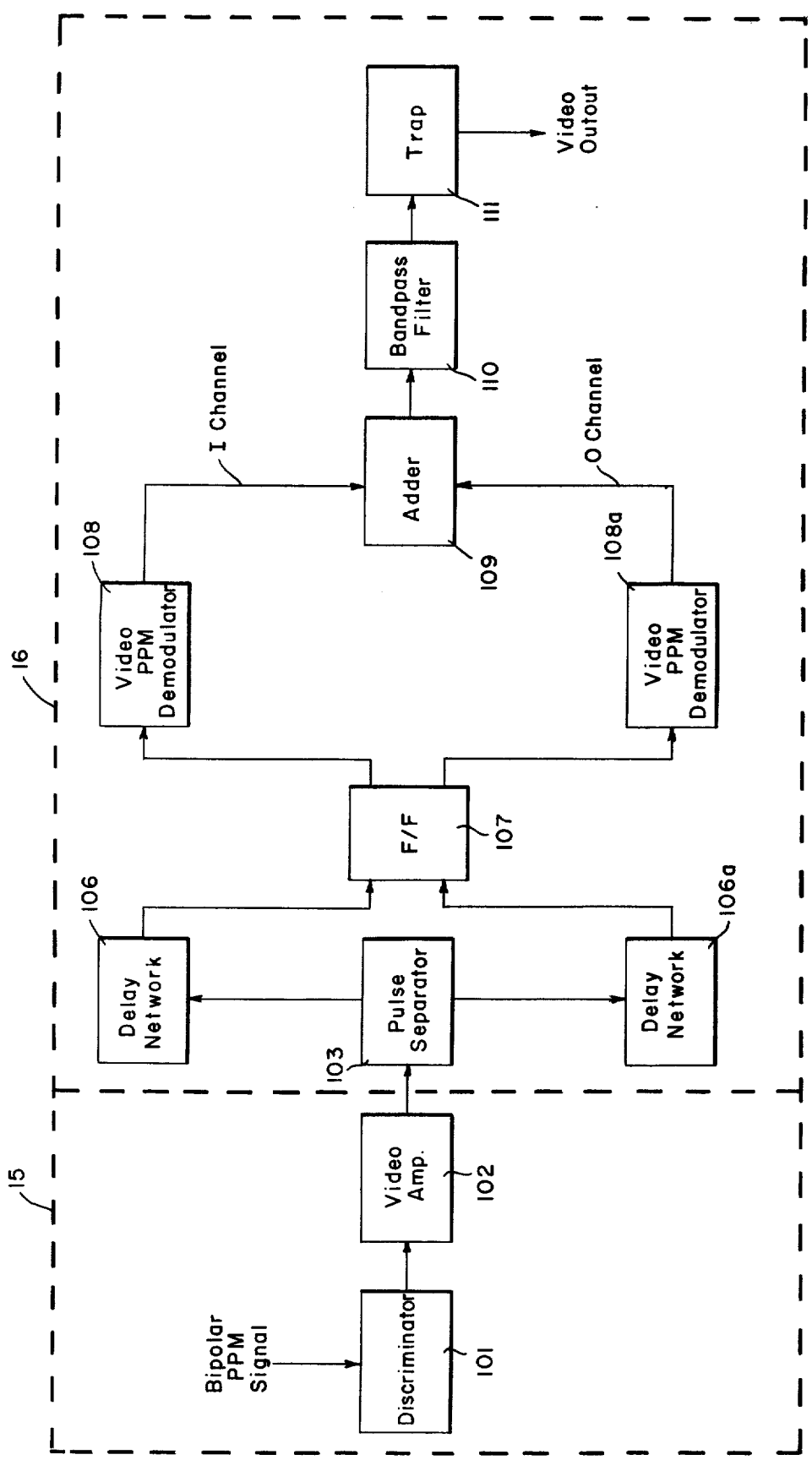
FIG. 14 is a schematic block diagram illustrating a decoder for detecting a pulse position modulated signal according to a fourth embodiment of the present invention.

Referring more specifically to FIG. 14, a decoder according to the fourth embodiment of the present invention for decoding pulse-position modulated pairs is now described. The receiver 15 includes a discriminator 101 which detects the positive and negative pulses of the bipolar pulse pairs which were coded by an encoder such as that of FIG. 2. The output terminal of the discriminator 101 is connected to the input terminal of a video amplifier 102. The output terminal of the amplifier 102 is connected to the input terminal of the decoder 16.

The decoder 16 includes a pulse separator 103 which is connected to the output terminal of the video amplifier 102. The separator 103 separates the positive from the negative pulses of the bipolar pulse pairs and provides an in-phase output signal and an out-of-phase output signal to the delay networks 106 and 106a, respectively. The positive pulses are applied to the in-phase channel while the negative pulses are applied to the out-of-phase channel. The pulse separator 103 is discussed in greater detail at FIG. 15.

The delay networks 106 and 106a adjust the phase of the two trains of pulses such that a zero video data input signal to the discriminator 101 provides output pulses that are 180° out of phase with each other. The delay networks 106 and 106a are discussed in greater detail in FIGS. 17 and 18.

The output terminals of the delay networks 106 and 106a are connected to the set and reset terminals, respectively, of a flip-flop 107. The flip-flop 107 provides a square-wave output signal on "I" and "O" channels in response to the input pulses from the delay networks 106 and 106a. The pulse from the delay network 106 determines the leading edge of the "I" channel output squarewave while the trailing edge of the square wave is determined by the pulse from the delay network 106a. The pulse from the delay network 106a establishes the leading edge of the "O" channel output squarewave pulse of the delay network 106a while the trailing edge of the square wave pulse is established by the pulse from the delay network 106. The "I" and "O" channels from the flip-flop 107 are 180° out of phase with each other. Thus, pulse-width modulated output pulses are provided by the flip-flop 107 on the "I" and "O" channels.

The "I" channel output terminal of the flip-flop 107 is connected to the input terminal of a demodulator 108. The demodulator 108 integrates the area of the pulse from the "I" channel of the flip-flop 107 and provides a sawtooth output signal. The slope of the sawtooth signal is determined by the pulse-width of the incoming signal. The demodulator 108 is described in greater detail in FIG. 19.

The "O" channel output terminal of the flip-flop 107 is connected to the demodulator 108a. The demodulator 108a integrates the area of the pulse from the "O" channel of the flip-flop 107 and provides a sawtooth output pulse similar to the pulse from the demodulator 108.

The output terminals of the demodulators 108 and 108a are connected to the first and second input terminals, respectively, of an adder 109. The adder may be a high-frequency differential amplifier which combines the two incoming demodulated signals and provides a video output to a display screen.

Figure 15:
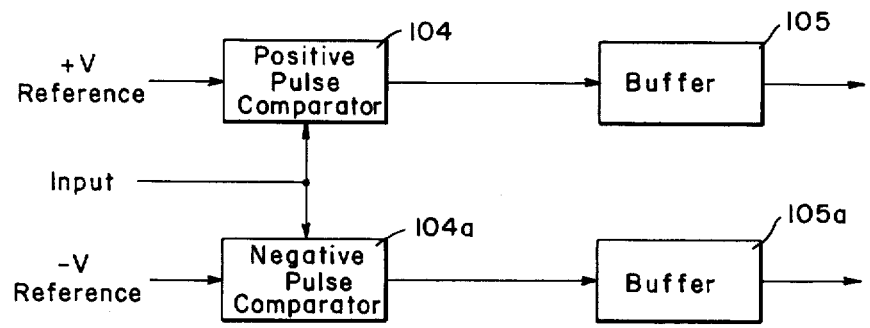
FIG. 15 is a schematic block diagram of a pulse separator according to FIG. 14.

Referring now to FIG. 15, a pulse separator includes a positive pulse comparator 104 which compares the input signal from the video amplifier 102 with a reference level voltage that is applied to the control terminal of the comparator 104. If the voltage level of the incoming signal exceeds the threshold level set by the positive reference voltage, the comparator 104, in response, provides an output pulse. The output terminal of the comparator 104 is connected to the buffer 105, which may be an emitter-follower transistor.

The signal from the video amplifier is also applied to a negative pulse comparator 104a, similar to the positive pulse comparator 104. The coded input signal is applied to one terminal of the comparator and a negative reference signal is applied to the second terminal. If the voltage level of the incoming signal is more negative than the threshold level set by the negative reference signal, the comparator 104a provides a positive output signal. The output terminal of the comparator 104a is connected to a buffer 105a which may be similar to the buffer 105.

Figure 16:
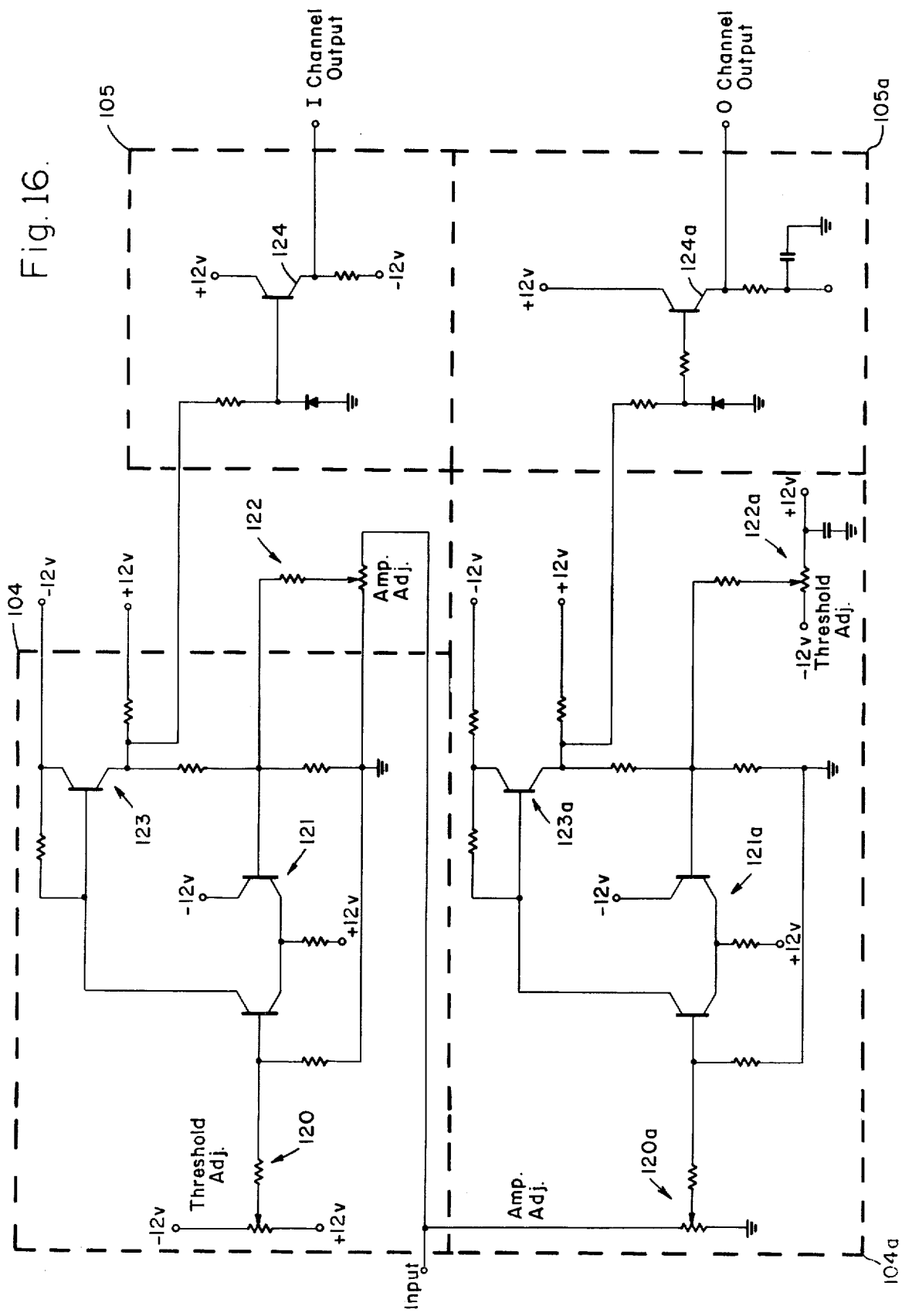
FIG. 16 is a schematic circuit diagram of a pulse separator according to FIG. 15.

Referring more specifically to FIG. 16, the positive pulse comparator 104 may be seen to include a threshold adjust network 120 consisting of a variable resistor to which the incoming signal from the video amplifier 102 is applied. The threshold adjust 120 is connected to one input terminal of a differential amplifier 121 which includes a pair of emitter-coupled transistors and the appropriate biasing voltages and transistors. The second input terminal of the differential amplifier 121 is connected to an amplitude adjust network 122. The output terminal of the differential amplifier 121 is connected to an amplifier network 123 which in turn is connected to the input terminal of the buffer 105. The buffer 105 includes an emitter-follower transistor 124 and suitable biasing circuitry. The buffer 105 provides the "I" channel output pulse which is pulse position modulated.

The negative pulse comparator 104a receives the incoming signal from the video amplifier 102 at the amplitude adjust network 120a which consists of a variable resistor. The amplitude adjust network 120a is connected to the second input terminal of a differential amplifier 121a. A threshold network 122a is connected to the first input terminal of the differential amplifier 121a. The output terminal of the amplifier 121a is connected to the amplifier 123a, connected in turn to the buffer 105a, which includes an emitter-follower transistor 124a. The buffer 105a provides the "O" channel output pulse which is also pulse position modulated. Together the buffer networks 105 and 105a provide the bipolar pulse position modulated pulses.

Figure 17:
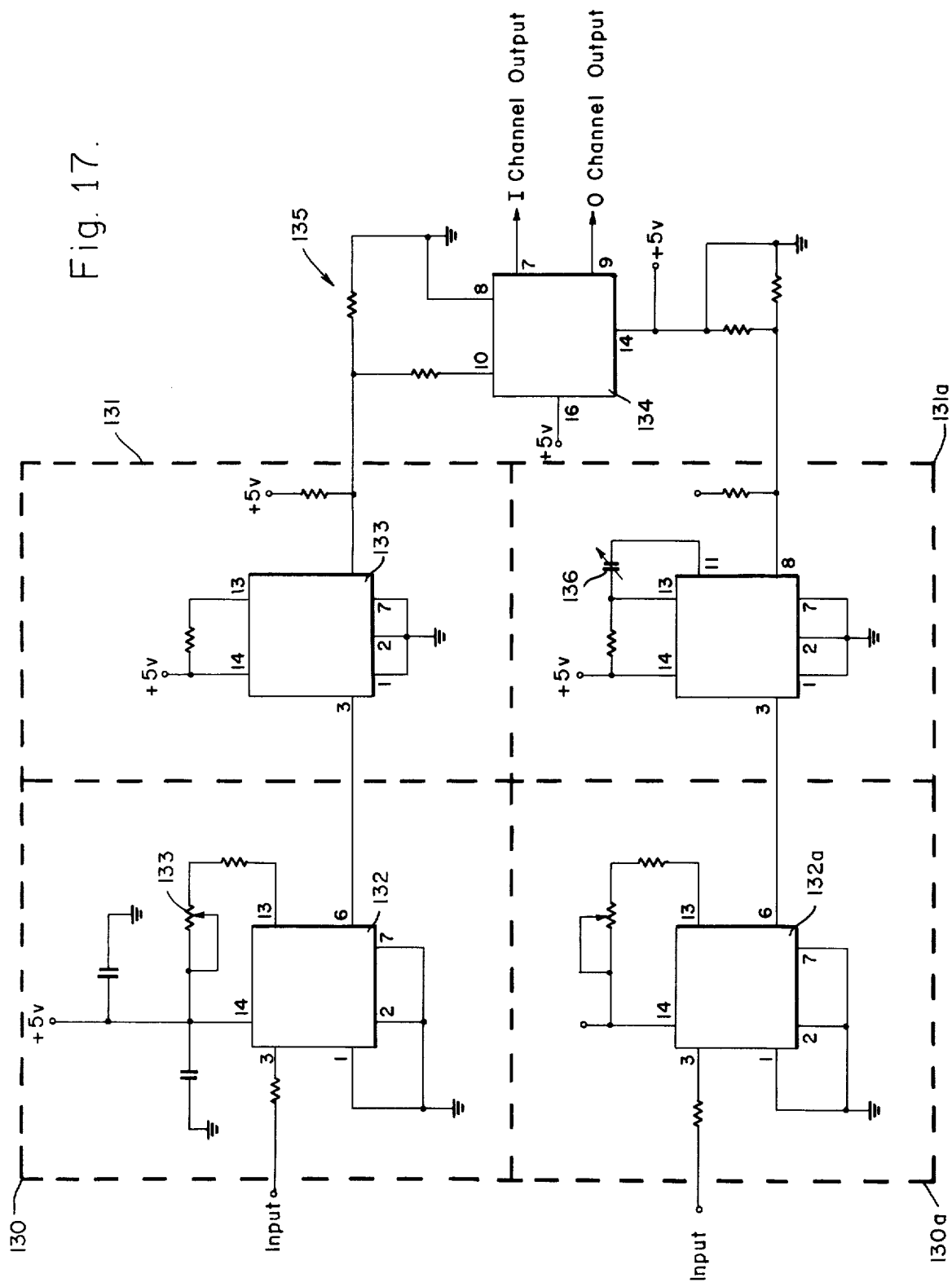
FIG. 17 is a schematic circuit diagram of a delay network according to FIG. 14.

Referring now to FIG. 17, a delay network according to FIG. 14 includes a monostable multivibrator 130 which receives an input signal from the in-phase channel of the pulse separator 103. The multivibrator 130 may have an output pulse which has a period of 100 nsecs and is adjustable about that period. The output terminal of the multivibrator 130 is connected to the input terminal of a monostable multivibrator 131 whose output pulse may have a period of 50 nsecs. The output terminal of the multivibrator 131 is connected to one input terminal of the flip-flop 107.

The out-of-phase channel of the pulse separator 103 is connected to the input terminal of a monostable multivibrator 130a which is similar to the multivibrator 130. The output terminal of the multivibrator 130a is connected to a multivibrator 131a which is similar to the multivibrator 131. The output terminal of the multivibrator 131a is connected to the second input terminal of the flip-flop 107.

The multivibrator 130 includes a retriggerable monostable multivibrator 132 such as a Fairchild Model 9601. Suitable biasing and period adjusting circuitry 133 is connected to the multivibrator 132. The multivibrator 131 includes a retriggerable monostable multivibrator 133 such as the multivibrator 132. Suitable biasing circuitry is connected to the multivibrator 133.

The flip-flop 107 may be an R/S type flip-flop 134 such as a Fairchild Catalog No. SN54S112J. Suitable biasing circuitry 135 is connected to the flip-flop 134.

The multivibrator 130a includes a retriggerable monostable multivibrator 132a similar to the multivibrator 132. Adjusting circuitry 133a is connected to the multivibrator 132a. The multivibrator 131a includes a retriggerable monostable multivibrator 133a similar to the multivibrator 133. Suitable biasing and adjusting circuitry 136 is connected to the multivibrator 133a. The output of the multivibrator 133 is connected to the second input terminal of the flip-flop 134.

Figure 18:
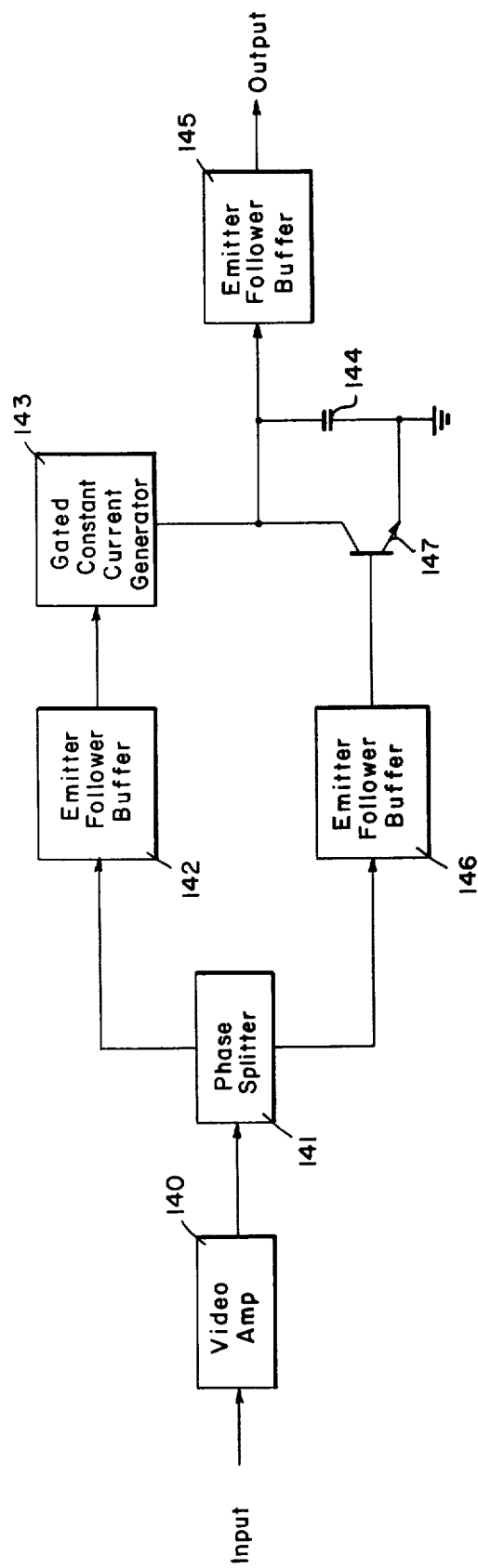
FIG. 18 is a schematic block diagram of a demodulator according to FIG. 14.

Referring more specifically to FIG. 18, a demodulator according to FIG. 14 includes a video amplifier 140 which receives the signals from the flip-flop 134. The output terminal of the video amplifier 140 is connected to the input terminal of a phase splitter 141, which provides an in-phase and out-of-phase output signal. The in-phase terminal of the phase splitter 141 is connected to the input terminal of an emitter follower buffer 142 which may be an emitter follower transistor and related circuitry. The output terminal of the buffer 142 is connected to the input terminal of a gated constant current generator 143. The current generator provides a positive ramping sawtooth signal in response to the pulse-width modulation of the phase splitter 141. The output terminal of the generator 143 is connected to the input terminal of a buffer 145 which may also be an emitter-follower transistor. The out-of-phase output terminal of the phase splitter 141 is connected to the input terminal of a buffer 146 which may be an emitter-follower transistor. The output terminal of the buffer 145 is connected to the input terminal of a reset network illustrated here as an NPN transistor 147. The collector electrode of the transistor 147 is connected to the output terminal of the generator 143 and the capacitor 144.

The operation of the demodulator according to FIG. 18 is as follows. The pulse-width modulated signal from the in-phase output terminal of the flip-flop 107 is amplified by the video amplifier 140 which in turn applies the pulse-width modulated signal to a phase splitter 141. The phase splitter provides an in-phase output signal to the buffer 142 which in turn controls the current generated by the gated constant current generator 143. The output current from the generator 143 charges the capacitor 144 in a sawtooth fashion. During the period that the generator 143 is charging the capacitor 144, the transistor 147 is maintained at cutoff by the out-of-phase output terminal of the phase splitter 141. However, during the period between pulses the phase splitter "turns on" the transistor 147 which discharges the capacitor 144, thereby resetting the demodulator for the next incoming pulse to the video amplifier 140.

The demodulator herein described is used in both the in-phase channels and out-of-phase channels of the decoder according to FIG. 14.

Figure 19:
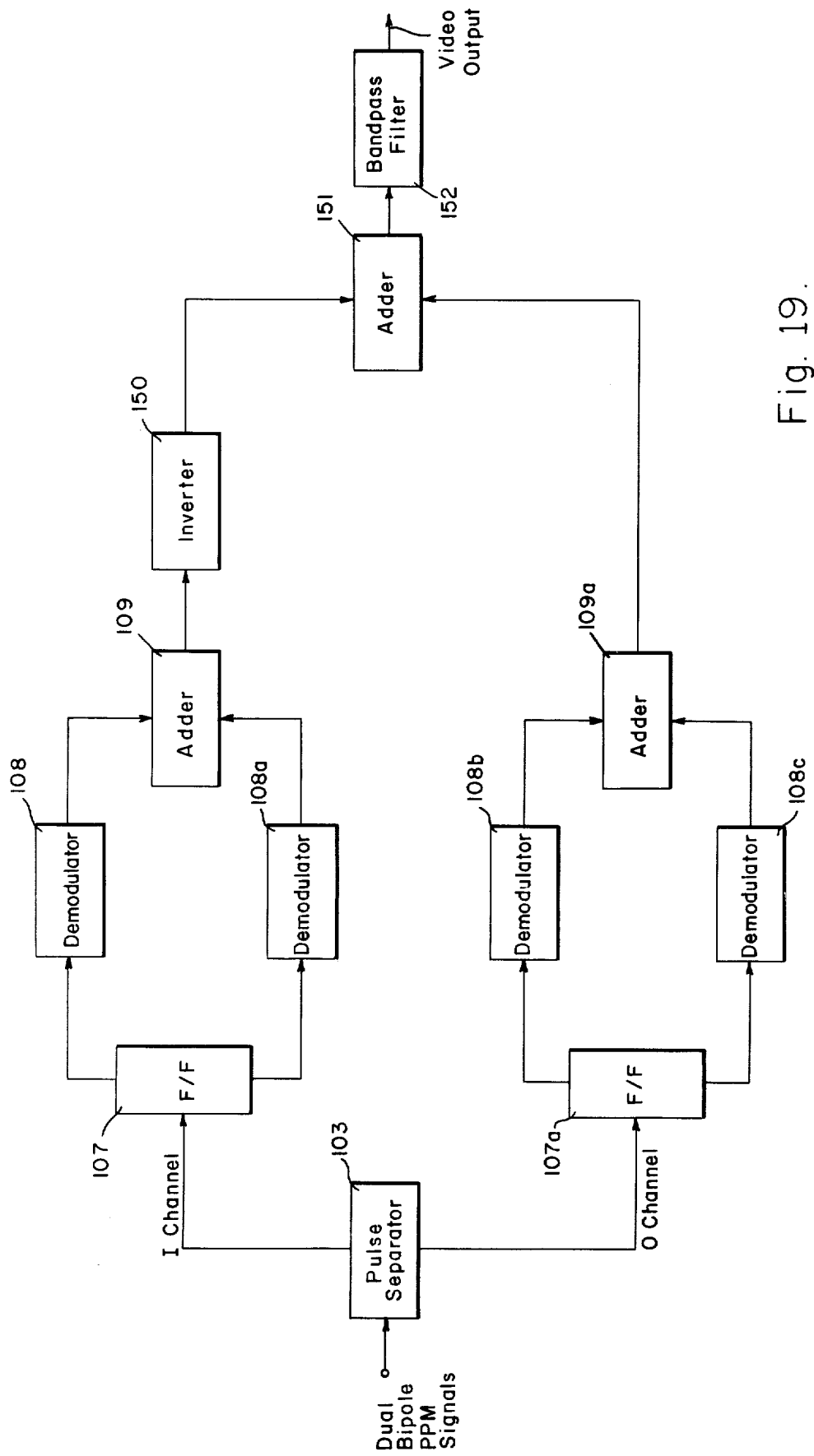
FIG. 19 is a schematic block diagram of a decoder according to a fifth embodiment of the present invention for decoding dual pairs of PPM pulses.

Referring more specifically to FIG. 19, a fifth embodiment according to the present invention decodes a dual pulse pair PPM signal generated by the second embodiment of the present invention. The decoder 18 includes a pulse separator 103 similar to the pulse separator described above in FIG. 14. The separator 103 separates the positive pulses of the dual pulse pairs from the negative pulses and provides the positive pulses on the in-phase output terminal. The separator 103 also provides the negative pulses of the dual pulse pairs on the out-of-phase output terminal. The in-phase terminal of the separator 103 is connected to the input terminal of the flip-flop 107 similar to the one described above in FIG. 14. The flip-flop 107 provides an in-phase channel and out-of-phase channel. The leading edge of the output pulse from the flip-flop 107 is determined by the first positive pulse from the separator 103 while the trailing edge is determined by the second pulse of the pulse pair from the separator 103. The in-phase channel of the flip-flop 107 is connected to the input terminal of the demodulator 108, similar to the one described above. The output terminal of the demodulator 108 is connected to one input terminal of a resistive adder 109. The out-of-phase channel from the flip-flop 107 is connected to the input terminal of the demodulator 108a, similar to the demodulator 108. The output terminal of the demodulator 108a is connected to the second input terminal of the adder 109. The output terminal of the adder 109 is connected to the input terminal of an inverter 150 which in turn is connected to the first input terminal of a resistive adder 151. Thus, two channels are demodulated by the demodulators 108 and 108a. The out-of-phase terminal of the pulse separator 103 provides the negative pulses of the dual pulse pair to the flip-flop 107a. The 107 separates the two negative pulses of the pulse pairs and provides the first negative pulse on the in-phase output channel which is connected to a demodulator 108b, similar to the demodulator 108. The output terminal of the demodulator 108b is connected to the first input terminal of a resistive adder 109a, similar to the adder 109. The out-of-phase output terminal from the flip-flop 107a is connected to the input terminal of a demodulator 108c, similar to the demodulator 108. The output terminal of the demodulator 108c is connected to the second input terminal of the adder 109a. The signals on the third and fourth channels are demodulated by the demodulators 108b and 108c and added together by the adder 109c. The output terminal of the adder 109a is connected to the resistive adder 151 which combines the demodulated output signals of the four channels. The output terminal of the adder 151 is connected to a bandpass filter 152 which filters out the residual signal of the high-frequency carrier.

The noise-cancelling feature of the fifth embodiment of the present invention occurs at the adder 151. The flip-flops 107 and 107a each provide signals having the same noise signal, which remains after the adders 109 and 109a have added their respective pulses. The inverter 150 inverts the signal in the "I" channel which coincidentally inverts the noise in that channel also. The adder 51 adds the signals from the inverter 150 and the adder 109a which results in the out-of-phase noise cancelling, while the video signal is not affected.

Figure 20:
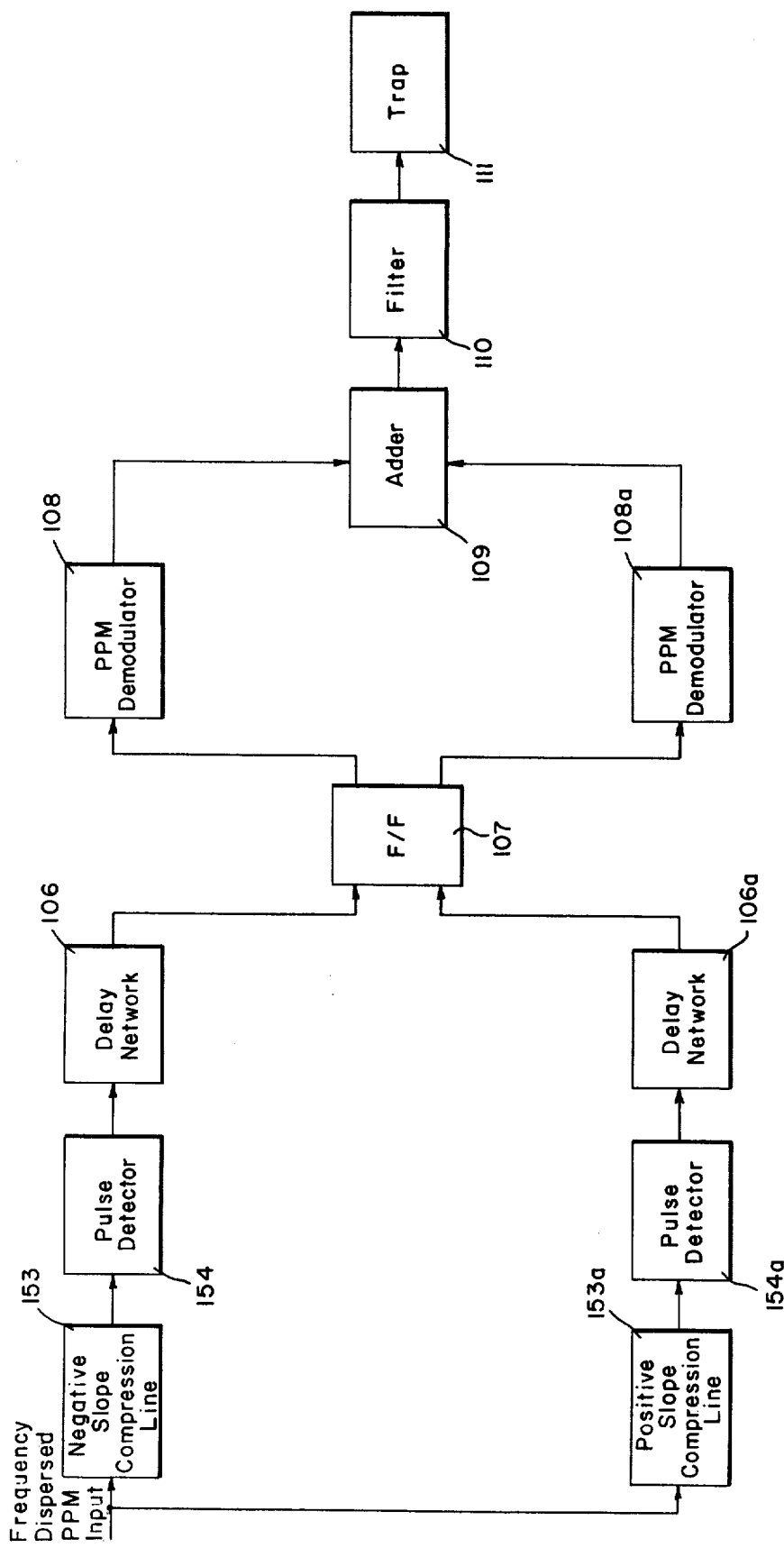
FIG. 20 is a schematic block diagram illustrating a sixth embodiment of the invention for decoding PPM pulse pairs which have been further coded by dispersive delay lines.

Referring now to FIG. 20, a decoder according to a sixth embodiment of the present invention decodes signals which have been coded by pulse position modulation and frequency dispersion as described in the third embodiment of the present invention. The output signal of the receiver 18 is applied to the input terminal of the decoder 18. The decoder 18 according to the sixth embodiment includes a first compression line or "chirp" filter 153 in the "I" channel, which compresses the incoming long pulsewidth into a high amplitude narrow pulse having a frequency approximately in the middle of the bandwidth. The "chirp" filter 153 has a negative-sloped transfer function and compresses only the incoming signals which have been dispersed by a dispersive delay line having a positive slope transfer function. That is, the lower frequencies are delayed the least while the higher frequencies are delayed most. The compression line 153 may be a surface acoustic wave device such as a dispersive delay line with a positive-sloped transfer function. A dispersive delay line may be used as a compression line merely by interchanging the input and output terminals.

The output terminal of the chirp filter 153 is connected to the input terminal of a pulse detector 154 which provides an output pulse in response to the main lobe of the compressed pulse. The output terminal of the pulse detector 154 is connected to the input terminal of a delay network 106 which is similar to the delay network described in the discussion of FIG. 14. The remainder of the "I" channel is similar to the "I" channel described in the above FIG. 14.

The out-of-phase or "O" channel of the decoder, according to FIG. 20, includes a "chirp" filter 153a similar to the chirp filter 153. The input terminal of the filter 153 is connected to the output terminal of the receiver 17. The chirp filter 153a has a positive-sloped transfer function and compresses only the long pulse which have been dispersed by a dispersive delay line having a negative slope transfer function. The chirp filter 153a may be similar to the filter 152 but having a positive or conjugate slope transfer function. The output terminal of the chirp filter 153a is connected to the input terminal of a pulse detector 154a, similar to the pulse detector 154. The output terminal of the pulse detector 154a is connected to the input terminal of the delay network 106a. The networks following the delay network 106a are identical to the networks described above in FIG. 14 and will therefore not be described in detail here.

Referring now to FIGS. 21a and 21b, they represent the output waveforms of a conventional PPM system and a PPM system utilizing the first embodiment for coding the input signal. Both waveforms represent a sinusoidal audio signal of 4 KHz which was sampled at a 6 KHz carrier frequency. In FIG. 21a it is noted that the waveform is not sinusoidal as it should be, and there is pronounced distortion as a result of the carrier frequency. In FIG. 21b, the 6 KHz sine wave is very regular, and there is no evidence of the carrier frequency interfering with the signal. The reason for the "clean" signal is that the carrier frequency cancels as a result of the pulse position modulation of the signal.

It should be apparent from the foregoing that the present invention provides a transmitter and receiver system which is used to transmit coded signals utilizing pulse position modulation, dual pulse position modulation, and pulse position modulation in conjunction with frequency dispersion for providing secure transmissions. The transmitter and receiver system herein disclosed further provides modulation frequencies which are a high percentage of the carrier frequency.

Although the present invention has been shown and described with reference to particular embodiments, nevertheless, various changes and modifications obvious to one skilled in the art to which the invention pertains are deemed to be within the purview of the invention.

What is claimed is:

1. In a transmitter and receiver system for transmission and reception of coded signals utilizing pulse position modulation with zero beats between the carrier and the modulation, said receiver having a decoder, an encoder in said transmitter, comprising:
    a source of a reference frequency signal forming the carrier frequency with negative and positive half cycles;
    input means for providing first and second push-pull analog input signals to first and second channels, respectively, said first and second analog signals being 180 degrees out of phase with each other;
    first modulation means in said first channel and responsive to said source for sampling said first analog signal and providing a first pulse position modulated pulse in response to said first input signal during each negative half cycle;
    second modulation means in said second channel and responsive to said source for sampling said first analog signal and providing a second pulse position modulated pulse in response to said second input signal during each positive half cycle; and
    combining means coupled to said first and second modulation means for combining during each cycle, said first and second pulse position modulated pulses into bipolar pulse pairs, each pair having a separation proportional to the sampled amplitude.

2. In a transmitter and receiver system according to claim 1, further comprising:
    first dispersive delay means coupled between said first modulation means and said combining means, said first dispersive delay means having a first transfer function with a first slope for providing dispersed pulses in response to said first modulation means; and
    second dispersive delay means coupled between said second modulation means and said combining means, said second dispersive delay means having a second transfer function being the conjugate of said first transfer function for providing dispersed pulses in response to said pulses from said second modulation means.

3. In a transmitter and receiver system according to claim 1, said decoder comprising:
    pulse detecting means for detecting said first and second pulses of said pairs of pulses;
    first pulse width modulation means coupled to said pulse detecting means, said first pulse width modulation means being responsive to said first pulse position modulated pulses and providing output pulses having widths determined by said first pulses;
    second pulse width modulation means coupled to said pulse detecting means, said second pulse width modulation means being responsive to said second pulse position modulated pulses and providing output pulses having widths determined by said second pulses; and coupling means responsive to said first and second pulse width modulation means for providing an analog output signal to a utilization circuit.

4. In a transmitter and receiver system according to claim 1, the combination comprising:
in said encoder, a first dispersive delay line coupled to said first modulation means for providing a first dispersed signal to said combining means; and a second dispersive delay line coupled to said second modulator means for providing a second dispersed signal to said combining means, said second dispersive delay line having a transfer function being the conjugate of the transfer function of said first dispersive delay line;
and in said decoder, first pulse compression means responsive to said first dispersed signals, said first pulse compression means having a transfer function being the conjugate of the transfer function of said first dispersive delay line;
second pulse compression means responsive to said second dispersed signals, said second pulse compression means having a transfer function being the conjugate of the first transfer function of said second dispersive delay line;
first and second pulse detecting means coupled to said first and second pulse compression means, respectively, for detecting first and second pulses of said pairs of pulses; and
first and second pulse width modulation means coupled to said first and second pulse detecting means, respectively, said pulse width modulation means being responsive to said pairs of pulses and providing output pulses having widths determined by the time offset within each of said pairs of pulses.

5. In a transmitter and receiver system for transmission and reception of pulse position modulated signals with said transmitter having an encoder, a decoder in said receiver comprising:
pulse detecting means for detecting first and second pulses of pulse pairs, said first and second pulses being pulse position modulated in a coded manner;
pulse separator means coupled to said pulse detecting means for separating said first pulses into a first channel and said second pulses into a second channel;
first pulse width modulation means coupled to said pulse separator means, said first pulse width modulation means being responsive to said first and second pulses and providing a first pulse width modulated signal on a first channel;
second pulse width modulation means coupled to said pulse separator means, said second pulse width modulation means being responsive to said first and second pulses and providing a second pulse width modulated signal on a second channel;
demodulating means coupled to said first and second pulse width modulation means for demodulating said first and second pulse width modulated signals to respectively provide first and second analog signals each including a beat signal; and
combining means coupled to said demodulating means for combining said first and second analog signals to cancel said beat signals and provide an output analog signal.

6. A decoder responsive to frequency dispersed PPM first and second pulses of a pair of pulses defining a code and provided by an encoder, comprising:
pulse compression means responsive to said first and second pulses, said pulse compression means having a first transfer function for said first pulses and having a second transfer function for said second pulses;
pulse detecting means coupled to said pulse compression means for detecting first and second pulses of said pair of pulses; and
pulse width modulation means coupled to said pulse detecting means for providing pulse width modulated pulses in response to said first and second pulse position modulated pulse pair; and
combining means responsive to said pulse width modulation means for providing an analog signal in response to said pulse width modulated pulses.

7. In the decoder according to claim 6, said pulse compression means comprising:
a first pulse compression line responsive to said first pulses of said pairs of pulses, having said first transfer function with a predetermined slope; and
a second pulse compression line being responsive to said second pulses of said pairs of pulses, having said second transfer function with a slope being the conjugate of said first slope.

8. In a transmitter and receiver system for transmission and reception of coded signals with said receiver having a decoder, an encoder in said transmitter comprising:
input means for receiving a time-varying signal;
first means responsive to said input means for providing first and second signals being out of phase with each other;
pulse generating means coupled to said first means for providing pairs of pulse position modulated pulses in response to the amplitude of said first and second signals at a preselected sampling frequency;
dispersive delay means coupled to said pulse generating means for providing a first dispersed signal having a first slope in response to said first pulses of said pairs of pulses and for providing a second dispersed signal having a second slope in response to said second pulses of said pairs of pulses, said first and second slopes being conjugate; and
combining means coupled to said dispersive delay means for combining said first and second dispersed signals.

9. An encoder for use in a transmission-reception system providing pulse-position modulated pulses, comprising:
phase-splitter means for receiving an analog-input signal and providing first and second analog signals out of phase with each other to first and second channels, respectively;
first current generator means in said first channel for receiving said first analog signal and generating a current signal proportional thereto;
first pulse-width multivibrator means coupled to said first current generator means for providing a pulse having a pulse-width in proportion to the current generated by said current generator means;
first pulse-position multivibrator means coupled to said first pulse-width multivibrator means for generating pulses having a predetermined pulse width and being pulse-position modulated in response to the width of the pulses from said first pulse-width multivibrator means;
second current generator means in said second channel for receiving said second analog signal from said phase-splitter means and providing a current signal proportional thereto;

second pulse-width multivibrator means coupled to said second current generator means for providing pulse-width modulated pulses in response to current signals from said second current generator means; and second pulse-position multivibrator means coupled to said second pulse-width multivibrator means for generating pulse-position modulated pulses having a predetermined pulse width in response to the pulse-width modulated pulses from said second pulse-width multivibrator means.

10. The invention, according to claim 9, further comprising:

combiner means for combining said pulse-position modulated pulses from said first pulse-position multivibrator means in said first channel and said pulse-position modulated pulses from said second pulse-position multivibrator means in said second channel and providing a single channel of bipolar pulse-position modulated pulses.

11. The invention, according to claim 10, comprising:

bandpass filter means coupled to said combiner means for providing a sine-wave output signal having positive-negative half-cycles being modulated in response to said bipolar pulse-position modulated pulses.

12. The invention, according to claim 9, comprising:

reference generator means for providing a control signal to said first and second current generator means for sampling said respective first and second analog signals at a predetermined frequency.

13. An encoder for use in a transmitter-receiver system utilizing pulse-position modulated pulses, comprising:

phase-splitter means for receiving an analog signal and providing first and second analog signals out of phase with each other;

first energy storage means for storing energy;

first current-generator means coupled to said energy storage means for charging said first energy storage means;

first discharge means coupled to said first energy storage means for discharging said stored energy in response to a first control signal;

first adder means coupled to said first energy storage means and to said phase-splitter means for adding said first analog signals and said stored energy in said first energy storage means;

first comparator means coupled to said first adder means for providing pulse-width modulated pulses in response to said first adder means;

first multivibrator means coupled to said first comparator means for providing first pulse-position modulated pulses in response to said first comparator means;

second energy storage means for storing energy;

second current generator means coupled to said second energy storage means for charging said second energy storage means;

second discharge means coupled to said second energy storage means for discharging said stored energy in response to a second control signal being out of phase with said first control signal;

second adder means coupled to said second energy storage means and to said phase-splitter means for adding said second analog signals and said stored energy in said second energy storage means;

second comparator means coupled to said second adder means for providing pulse-width modulated pulses in response to said second adder means; and second multivibrator means coupled to said second comparator means for providing second pulse position modulated pulses in response to said second comparator means.

14. An encoder for generating dual bipolar pulse-position modulated pulses for use in a transmitter-receiver system, comprising:

first phase-splitter means for receiving an analog input signal and providing first and second analog signals to first and second channels respectively, said first and second signals being out of phase with each other;

said first channel including second phase-splitter means for receiving said first analog signal and providing third and fourth analog signals being out of phase with each other;

first modulator means coupled to said second phase-splitter means for receiving said third and fourth signals and providing first pairs of pulse-position modulated pulses;

third phase-splitter means coupled to said first phase-splitter means for receiving said second analog signal and providing fifth and sixth analog signals being out of phase with each other;

second modulator means coupled to third phase splitter means for receiving said fifth and sixth analog signals and providing second pairs of pulse-position modulated pulses; and combiner means coupled to said first and second modulator means for providing dual bipolar pulse-position modulated pulse pairs.

15. An encoder for use in a transmission-reception system, comprising;

phase-splitter means for responding to an input analog signal and providing first and second analog signals being out of phase with each other;

first pulse position modulator means coupled to said phase-splitter means for providing first pulse-position modulated pulses at a predetermined frequency in response to said first analog signal;

first impulse driver means coupled to said first pulse position modulator means for providing first impulse signals in response to said first pulses;

first dispersive delay means coupled to said first impulse driver means for providing a frequency dispersed signal having a first slope, in response to said first impulse signal;

second pulse position modulator means coupled to said phase-splitter means for providing second pulse-position modulated pulses at a predetermined frequency in response to said second analog signal;

second impulse driver means coupled to said second pulse position modulator means for providing second impulse signals in response to said second pulses;

second dispersive delay means coupled to said second impulse driver means for providing a frequency dispersed signal having a slope being the conjugate of said first slope; and combiner means coupled to said first and second dispersive delay means for combining said frequency dispersed signals and providing a single channel output signal.

16. A decoder for use in a transmission-reception system providing pulse-position modulated pulses, comprising:

discriminator means for detecting first and second pulses of bipolar pulse-position modulated signals;

pulse separator means coupled to said discriminator means for providing said first pulses on a first channel and for providing said second pulses on a second channel;

flip-flop means coupled to said pulse separator means for providing first and second pulse-width modulated signals in response to said first and second pulses;

first demodulator means coupled to said flip-flop means for demodulating said first pulse-width modulated signals;

second demodulator means coupled to said flip-flop means for demodulating said second pulse-width modulated signals; and adder means coupled to said first and second demodulator means for providing a single channel analog signal.

17. A decoder responsive to the encoder of claim 16 comprising:

first and second pulse compression means for receiving a frequency dispersed pulse-position modulated signal, said first compression means for compressing a frequency dispersed signal having a first slope, said second pulse compressions means for compressing a frequency dispersed signal having a conjugate slope, said first and second pulse compression means being responsive to said output signal provided by said combiner means.

18. A decoder for use in a transmission-reception system for providing pulse position modulated pulses, comprising:

pulse separator means for providing first pulse position modulated signals on a first channel and second pulse position modulated signals on a second channel;

first flip-flop means coupled to said pulse separator means for providing first and second pulse-width modulated signals in response to said first pulse-position modulated signals;

first and second pulse-width demodulator means coupled to said first flip-flop means for demodulating said first and second pulse-width modulated signals respectively;

first adder means coupled to first and second demodulator means for providing a first analog signal on a first channel;

second flip-flop means coupled to said pulse separator means for providing third and fourth pulse-width modulated signals in response to said second pulse-position modulated signals;

third and fourth pulse-width demodulator means coupled to said second flip-flop means for demodulating said third and fourth pulse-width modulated signals respectively;

second adder means coupled to said third and fourth pulse-width demodulator means for providing an analog signal on a single channel, and third adder means coupled to first and second adder means for providing a single analog signal.

19. In a transmitter and receiver system for transmission and receiption of coded signal modulations utilizing pulse position modulation and for cancelling the beat frequency signals between a modulation frequency and a carrier frequency, an encoder and decoder comprising:

a source of push-pull analog input signals;

a source of reference signals cycling at the carrier frequency with negative and positive half cycles;

means coupled to said source of input signals and to said source of reference signals for deriving first and second push-pull pulse position modulated pulses during respective negative and positive half cycles of said reference signals;

means for responding to said first and second push-pull pulses and to respectively derive third and fourth push-pull pulse position modulated pulses therefrom; and means responsive to said third and fourth pulses including combining means for providing coded signal modulations and for cancelling said beat frequency signals.

* * * * *